(12) United States Patent
Elshafie et al.

(10) Patent No.: US 12,531,675 B2
(45) Date of Patent: Jan. 20, 2026

(54) CAPABILITY-BASED MODULATION OF COMMUNICATIONS BETWEEN WIRELESS COMMUNICATION DEVICES

(71) Applicant: QUALCOMM Incorporated, San Diego, CA (US)

(72) Inventors: Ahmed Elshafie, San Diego, CA (US); Huilin Xu, Temecula, CA (US); Wei Yang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 18/316,039

(22) Filed: May 11, 2023

(65) Prior Publication Data
US 2024/0380529 A1    Nov. 14, 2024

(51) Int. Cl.
*H04L 5/00* (2006.01)
*H04L 27/26* (2006.01)

(52) U.S. Cl.
CPC ............ *H04L 5/001* (2013.01); *H04L 5/0008* (2013.01); *H04L 27/2602* (2013.01)

(58) Field of Classification Search
CPC .... H04L 5/001; H04L 5/0008; H04L 27/2602
See application file for complete search history.

(56) References Cited

U.S. PATENT DOCUMENTS

2024/0319324 A1* 9/2024 Liu ........................ G01S 7/0233

* cited by examiner

*Primary Examiner* — Duc C Ho
(74) *Attorney, Agent, or Firm* — Guang Y. Zhang; Holland & Hart LLP

(57) ABSTRACT

Methods, systems, and devices for wireless communications are described. A first user equipment (UE) may receive, from a second UE, a capability message indicating that the second UE is capable of processing one or more types of modulated waveforms. The first UE may encode a set of orthogonal frequency division multiplexing (OFDM) symbols with a first set of data for an uplink transmission to a network entity via a communication link between the first UE and the network entity, and may modulate the set of encoded OFDM symbols with a second set of data for the second UE according to a type of the one or more types of modulated waveforms capable of being processed by the second UE. The first UE may transmit and the second UE may monitor for the modulated set of encoded OFDM symbols via the communication link.

30 Claims, 20 Drawing Sheets

OFDM Symbol 420

Puncturing Pattern 425

CAPABILITY-BASED MODULATION OF COMMUNICATIONS BETWEEN WIRELESS COMMUNICATION DEVICES

FIELD OF TECHNOLOGY

The following relates to wireless communications, including capability-based modulation of communications between wireless communication devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems (e.g., NR wireless communications systems) may include passive internet of things (IoT) devices, which may communicate using passive communication technologies, such as backscatter communication.

SUMMARY

The described techniques relate to improved methods, systems, devices, and apparatuses that support capability-based modulation of communications between wireless communication devices. A helper user equipment (UE) (e.g., a first UE, a transmitting UE) may use a communication link between a network entity and the helper UE to communicate data bits to a reader UE (e.g., a receiving UE) that is configured for passive communications (e.g., with a passive internet of things (IoT) device, with a passive radio frequency (RF) device). For example, the helper UE may determine that the reader UE is capable of processing modulated waveforms either via inference (e.g., based on one or more inherent characteristics of the reader UE) or via explicit indication. The helper UE may modulate a set of symbols (such as orthogonal frequency division multiplexing (OFDM) symbols), which may be encoded with a dataset for a network entity, with a second dataset for the reader UE. In some examples, the helper UE may use a set of symbols indicated by the network entity to transmit the encoded and modulated OFDM symbols. The reader UE may monitor the indicated set of symbols for the transmission to the network entity and may decode the encoded and modulated OFDM symbols for a communication from the helper UE. As such, latency may be decreased and resources may be conserved by transmitting a single message with data for two entities via a communication link between the helper UE and the network entity (e.g., UE-to-network air interface).

A method for wireless communication at a first UE is described. The method may include receiving, from a second UE, a capability message indicating that the second UE is capable of processing one or more types of modulated waveforms, encoding a set of OFDM symbols with a first set of data for an uplink transmission to a network entity via a communication link between the first UE and the network entity, modulating, based on the capability message and on the encoding, the set of encoded OFDM symbols with a second set of data for the second UE according to a type of the one or more types of modulated waveforms capable of being processed by the second UE, and transmitting the modulated set of encoded OFDM symbols via the communication link.

An apparatus for wireless communication at a first UE is described. The apparatus may include a memory, and a processor coupled to the memory. The processor may be configured to cause the apparatus to receive, from a second UE, a capability message indicating that the second UE is capable of processing one or more types of modulated waveforms, encode a set of OFDM symbols with a first set of data for an uplink transmission to a network entity via a communication link between the first UE and the network entity, modulating, base at least in part on the capability message and on the encoding, the set of encoded OFDM symbols with a second set of data for the second UE according to a type of the one or more types of modulated waveforms capable of being processed by the second UE, and transmit the modulated set of encoded OFDM symbols via the communication link.

Another apparatus for wireless communication at a first UE is described. The apparatus may include means for receiving, from a second UE, a capability message indicating that the second UE is capable of processing one or more types of modulated waveforms, means for encoding a set of OFDM symbols with a first set of data for an uplink transmission to a network entity via a communication link between the first UE and the network entity, means for modulating, based on the capability message and on the encoding, the set of encoded OFDM symbols with a second set of data for the second UE according to a type of the one or more types of modulated waveforms capable of being processed by the second UE, and means for transmitting the modulated set of encoded OFDM symbols via the communication link.

A non-transitory computer-readable medium storing code for wireless communication at a first UE is described. The code may include instructions executable by a processor to receive, from a second UE, a capability message indicating that the second UE is capable of processing one or more types of modulated waveforms, encode a set of OFDM symbols with a first set of data for an uplink transmission to a network entity via a communication link between the first UE and the network entity, modulating, base at least in part on the capability message and on the encoding, the set of encoded OFDM symbols with a second set of data for the second UE according to a type of the one or more types of modulated waveforms capable of being processed by the second UE, and transmit the modulated set of encoded OFDM symbols via the communication link.

In some examples of the method, apparatuses, and non-transitory computer-readable medium described herein, transmitting the modulated set of encoded OFDM symbols may include operations, features, means, or instructions for transmitting the modulated set of encoded OFDM symbols via the communication link to the network entity, where the communication link includes a UE-to-network air interface.

Some examples of the method, apparatuses, and non-transitory computer-readable medium described herein may further include operations, features, means, or instructions for receiving, from the network entity, an indication of a set of occasions for transmitting the modulated set of encoded OFDM symbols via the communication link, where the set of occasions may be for the first UE and the second UE.

In some examples of the method, apparatuses, and non-transitory computer-readable medium described herein, at least one occasion of the set of occasions may be dedicated for one or more of a channel sate information report between the first UE and the second UE, configuration information between the first UE and the second UE, power control information between the first UE and the second UE, RF tag information, or any combination thereof.

In some examples of the method, apparatuses, and non-transitory computer-readable medium described herein, encoding the set of OFDM symbols with the first set of data may include operations, features, means, or instructions for encoding a set of bits associated with a sounding reference signal, a physical uplink shared channel, or a physical uplink control channel.

In some examples of the method, apparatuses, and non-transitory computer-readable medium described herein, modulating the set of encoded OFDM symbols with the second set of data may include operations, features, means, or instructions for modulating the set of encoded OFDM symbols with a set of orthogonal cover codes indicating the second set of data.

In some examples of the method, apparatuses, and non-transitory computer-readable medium described herein, modulating the set of encoded OFDM symbols with the second set of data may include operations, features, means, or instructions for modulating the set of encoded OFDM symbols with the second set of data including one or more of a pattern identification, a sequence identification, or a scrambling identification, corresponding to the second set of data.

Some examples of the method, apparatuses, and non-transitory computer-readable medium described herein may further include operations, features, means, or instructions for receiving, from the network entity, a control signal indicating one or more parameters for a set of orthogonal cover codes and applying the one or more parameters to the set of OFDM symbols as part of encoding the second set of data in accordance with an orthogonal cover code of the set of orthogonal cover codes.

Some examples of the method, apparatuses, and non-transitory computer-readable medium described herein may further include operations, features, means, or instructions for receiving, from the network entity, a grant including an indication to modulate the set of encoded OFDM symbols with the second set of data for the second UE and indicating a first set of multiple resources for communicating with the network entity and indicating a second set of resources for transmitting the second set of data to the network entity.

In some examples of the method, apparatuses, and non-transitory computer-readable medium described herein, receiving the indication may include operations, features, means, or instructions for receiving downlink control information including the indication, a first timing offset for transmitting the second set of data, and a second timing offset for transmitting the modulated set of encoded OFDM symbols via the communication link.

Some examples of the method, apparatuses, and non-transitory computer-readable medium described herein may further include operations, features, means, or instructions for transmitting, to the network entity, an indication of the second set of data prior to transmitting the modulated set of encoded OFDM symbols via the communication link.

In some examples of the method, apparatuses, and non-transitory computer-readable medium described herein, receiving the capability message may include operations, features, means, or instructions for receiving the capability message via a random access channel message 1, a random access channel message 3, a UE class indication, a layer 1 message, a layer 2 message, or a layer 3 message, or any combination thereof.

Some examples of the method, apparatuses, and non-transitory computer-readable medium described herein may further include operations, features, means, or instructions for transmitting a capability enquiry message to the second UE, where the capability message may be received in response to the capability enquiry message.

In some examples of the method, apparatuses, and non-transitory computer-readable medium described herein, the one or more types of modulated waveforms includes on/off key-based orthogonal frequency-division multiplexing waveforms, discrete Fourier transform-based modulated waveforms, Zadoff-Chu modulated waveforms, pulse position modulated waveforms, pulse-width modulated waveforms, pulse-amplitude modulated waveforms, amplitude-shift keying-based modulated waveforms, phase-shift keying-based modulated waveforms, frequency-shift keying-based modulated waveforms, Manchester modulated waveforms, chirp-based modulated waveforms, Walsh modulated waveforms, or any combination thereof.

A method for wireless communication at a second UE is described. The method may include transmitting, to a first UE, a capability message indicating that the second UE is capable of processing one or more types of modulated waveforms, monitoring for a set of OFDM symbols that is encoded with a first set of data for an uplink transmission from the first UE and a network entity that is modulated with a second set of data for the second UE according to a type of the one or more types of modulated waveforms capable of being processed by the second UE, and decoding the second set of data modulated with the one or more types of modulated waveforms by processing the set of OFDM symbols based on monitoring for the set of OFDM symbols.

An apparatus for wireless communication at a second UE is described. The apparatus may include a memory, and a processor coupled to the memory. The processor may be configured to cause the apparatus to transmit, to a first UE, a capability message indicating that the second UE is capable of processing one or more types of modulated waveforms, monitor for a set of OFDM symbols that is encoded with a first set of data for an uplink transmission from the first UE and a network entity that is modulated with a second set of data for the second UE according to a type of the one or more types of modulated waveforms capable of being processed by the second UE, and decode the second set of data modulated with the one or more types of modulated waveforms by processing the set of OFDM symbols based on monitoring for the set of OFDM symbols.

Another apparatus for wireless communication at a second UE is described. The apparatus may include means for transmitting, to a first UE, a capability message indicating that the second UE is capable of processing one or more types of modulated waveforms, means for monitoring for a set of OFDM symbols that is encoded with a first set of data for an uplink transmission from the first UE and a network entity that is modulated with a second set of data for the second UE according to a type of the one or more types of modulated waveforms capable of being processed by the second UE, and means for decoding the second set of data modulated with the one or more types of modulated waveforms by processing the set of OFDM symbols based on monitoring for the set of OFDM symbols.

A non-transitory computer-readable medium storing code for wireless communication at a second UE is described. The code may include instructions executable by a processor to transmit, to a first UE, a capability message indicating that the second UE is capable of processing one or more types of modulated waveforms, monitor for a set of OFDM symbols that is encoded with a first set of data for an uplink transmission from the first UE and a network entity that is modulated with a second set of data for the second UE according to a type of the one or more types of modulated waveforms capable of being processed by the second UE, and decode the second set of data modulated with the one or more types of modulated waveforms by processing the set of OFDM symbols based on monitoring for the set of OFDM symbols.

In some examples of the method, apparatuses, and non-transitory computer-readable medium described herein, processing the set of OFDM symbols may include operations, features, means, or instructions for dropping one or more encoded bits of the set of OFDM symbols encoded with the first set of data.

In some examples of the method, apparatuses, and non-transitory computer-readable medium described herein, processing the set of OFDM symbols may include operations, features, means, or instructions for processing the set of OFDM symbols using a set of orthogonal cover codes of the modulated set of OFDM symbols, where the set of orthogonal cover codes carries the second set of data.

Some examples of the method, apparatuses, and non-transitory computer-readable medium described herein may further include operations, features, means, or instructions for performing a synchronization procedure with the first UE using a set of dedicated reference signal resources via a UE-to-network air interface.

Some examples of the method, apparatuses, and non-transitory computer-readable medium described herein may further include operations, features, means, or instructions for receiving, from the network entity, an indication of a set of occasions to monitor for the set of OFDM symbols, where the set of occasions may be for the first UE and the second UE.

In some examples of the method, apparatuses, and non-transitory computer-readable medium described herein, at least one occasion of the set of occasions may be dedicated for one or more of a channel sate information report between the first UE and the second UE, configuration information between the first UE and the second UE, power control information between the first UE and the second UE, RF tag information, or any combination thereof.

A method for wireless communication at a network entity is described. The method may include transmitting, to each of a first UE and a second UE, an indication of a set of occasions for communicating one or more types of modulated waveforms, monitoring for a set of OFDM symbols that is encoded with a first set of data for an uplink transmission from the first UE and that is modulated with a second set of data for the second UE according to a type of one or more types of modulated waveforms capable of being processed by the second UE based on the indication, and decoding the encoded first set of data by processing the modulated set of encoded OFDM symbols based on the monitoring.

An apparatus for wireless communication at a network entity is described. The apparatus may include a memory, and a processor coupled to the memory. The processor may be configured to cause the apparatus to transmit, to each of a first UE and a second UE, an indication of a set of occasions for communicating one or more types of modulated waveforms, monitor for a set of OFDM symbols that is encoded with a first set of data for an uplink transmission from the first UE and that is modulated with a second set of data for the second UE according to a type of one or more types of modulated waveforms capable of being processed by the second UE based on the indication, and decode the encoded first set of data by processing the modulated set of encoded OFDM symbols based on the monitoring.

Another apparatus for wireless communication at a network entity is described. The apparatus may include means for transmitting, to each of a first UE and a second UE, an indication of a set of occasions for communicating one or more types of modulated waveforms, means for monitoring for a set of OFDM symbols that is encoded with a first set of data for an uplink transmission from the first UE and that is modulated with a second set of data for the second UE according to a type of one or more types of modulated waveforms capable of being processed by the second UE based on the indication, and means for decoding the encoded first set of data by processing the modulated set of encoded OFDM symbols based on the monitoring.

A non-transitory computer-readable medium storing code for wireless communication at a network entity is described. The code may include instructions executable by a processor to transmit, to each of a first UE and a second UE, an indication of a set of occasions for communicating one or more types of modulated waveforms, monitor for a set of OFDM symbols that is encoded with a first set of data for an uplink transmission from the first UE and that is modulated with a second set of data for the second UE according to a type of one or more types of modulated waveforms capable of being processed by the second UE based on the indication, and decode the encoded first set of data by processing the modulated set of encoded OFDM symbols based on the monitoring.

In some examples of the method, apparatuses, and non-transitory computer-readable medium described herein, processing modulated set of encoded OFDM symbols may include operations, features, means, or instructions for dropping one or more modulated bits of the set of OFDM symbols modulated with the second set of data for the second UE.

Some examples of the method, apparatuses, and non-transitory computer-readable medium described herein may further include operations, features, means, or instructions for receiving, from the first UE, an indication of the second set of data, where dropping the one or more encoded bits of the set of OFDM symbols modulated with the second set of data may be based on receiving the indication.

Some examples of the method, apparatuses, and non-transitory computer-readable medium described herein may further include operations, features, means, or instructions for transmitting, to the first UE, a control signal indicating one or more parameters for a set of orthogonal cover codes as part of encoding the set of OFDM symbols with the second set of data in accordance with an orthogonal cover code of the set of orthogonal cover codes.

In some examples of the method, apparatuses, and non-transitory computer-readable medium described herein, processing the modulated set of encoded OFDM symbols may include operations, features, means, or instructions for decoding the second set of data jointly with the first set of data based on transmitting the control signal indicating the one or more parameters for the set of orthogonal cover codes.

Some examples of the method, apparatuses, and non-transitory computer-readable medium described herein may further include operations, features, means, or instructions for transmitting, to the first UE, a grant including an indication to modulate the set of encoded OFDM symbols with the second set of data for the second UE and indicating a first set of multiple resources for communicating with the network entity and indicating a second set of resources for transmitting the second set of data to the network entity.

In some examples of the method, apparatuses, and non-transitory computer-readable medium described herein, transmitting the indication may include operations, features, means, or instructions for transmitting downlink control information including the indication, a first timing offset for transmitting the second set of data, and a second timing offset for transmitting the modulated set of encoded OFDM symbols to the network entity.

Some examples of the method, apparatuses, and non-transitory computer-readable medium described herein may further include operations, features, means, or instructions for transmitting, to the first UE, control signaling indicating a puncturing pattern for encoding the set of OFDM symbols with the second set of data.

DETAILED DESCRIPTION

Figure 1:
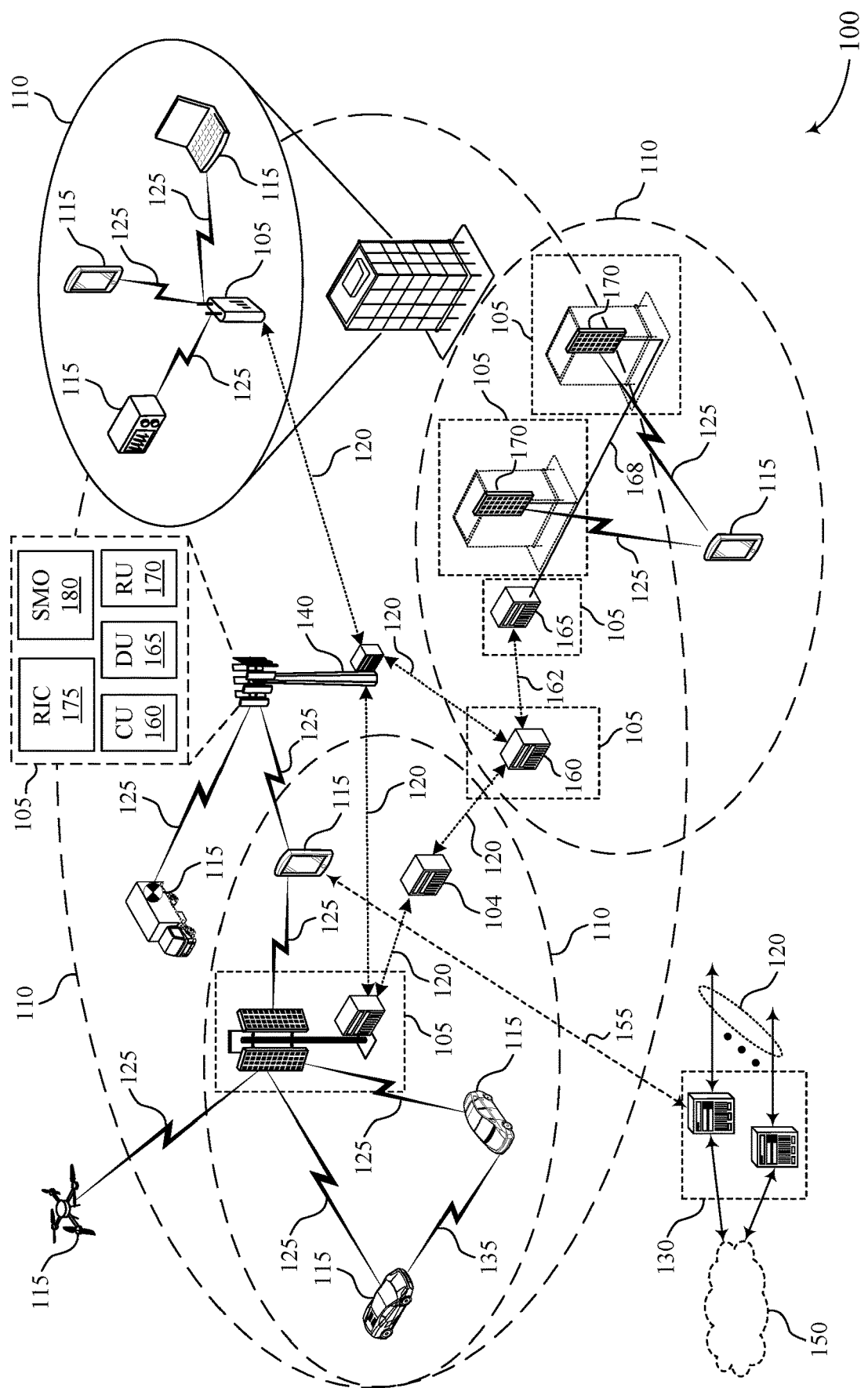
FIG. 1 shows an example of a wireless communications system that supports capability-based modulation of communications between wireless communication devices in accordance with one or more aspects of the present disclosure.

Some wireless communications systems (e.g., such as new radio (NR) wireless communications systems) may include passive wireless devices, such as passive internet of things (IoT) devices or passive radio frequency (RF) devices, which may be referred to as a tag, RF device, passive device, passive wireless device, passive IoT device, or the like. Passive wireless devices may communicate using passive communication technologies such as backscatter communication, which may be suitable for low power or low cost of devices.

Bi-static or multi-static reading involves the reading of information from an RF device (such as an RF tag) using two or more user equipment (UE). For example, two UEs may communicate with one or more tags. In some such examples, the two UEs may communicate with each other directly, for example, to initiate a bi-static or multi-static reading procedure, to change transmission parameters for communications with the tags, to change the time division duplexing (TDD) pattern used for communications (e.g., powerup time, command/query time, response time from tag), etc. Thus, a communication link or interface between UEs that has low latency, and that is coherent with the potential link that will be used between UEs and the tag(s), may be beneficial.

A network entity may configure a helper UE to assist communicates between an RF device and a reader UE that supports half-duplex communications. The network entity may allocate uplink resources to the helper UE, the reader UE, or both for communicating a continuous wave (e.g., during uplink slots). The helper UE may transmit the continuous wave via the allocated uplink slots, which may be used by an activated the RF device to reflect a modulated version of the continuous wave to the reader UE. For example, the network entity may initially transmit a first continuous wave via a quantity of downlink slots and the helper UE may transmit a second continuous wave during uplink slots (which are allocated for uplink communications between the helper and the network entity) that follow (e.g., are subsequent to) the downlink slots. The reader UE may monitor for and receive the continuous wave during the uplink slots. In some examples, the helper UE may use the communication link between the network entity and the helper UE to communicate data bits to the reader UE. For example, the helper UE may determine that the reader UE is capable of processing modulated waveforms either by inference or by explicit indication (e.g., the reader UE may transmit a capability message to the helper UE indicating which waveforms the reader UE is capable of processing), and the helper UE may modulate a set of orthogonal frequency division multiplexing (OFDM) symbols, which may be encoded with data intended for a network entity, with data for the reader UE.

The helper UE may use a set of symbols indicated by the network entity to transmit the encoded and modulated waveform including the OFDM symbols such that the reader UE monitors for the transmission to the network entity. As such, latency may be decreased and resources may be conserved through transmission of one message carrying data for two entities (e.g., the network entity and the reader UE) via an uplink communication link (e.g., a Uu communication link) between the helper UE and the network entity.

Aspects of the disclosure are initially described in the context of wireless communications systems. Aspects of the disclosure are further described via wireless communication patterns and a process flow. Aspects of the disclosure are further illustrated by and described with reference to apparatus diagrams, system diagrams, and flowcharts that relate to capability-based modulation of communications between wireless communication devices.

FIG. 1 shows an example of a wireless communications system 100 that supports capability-based modulation of communications between wireless communication devices in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support capability-based modulation of communications between wireless communication devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support passive IoT communications between one or more RF devices, such as an RFID tag (which may be an example of an IoT device), and wireless devices, such as network entities 105 and UEs 115. For example, the wireless communications system 100 may support bi-static (or multi-static) communications between two or more UE 115 and an RF device. In some examples, an RF device may be "read" by a UE 115 referred to as a reader UE 115. In some examples, the reader UE 115 may be capable of half-duplex communications and as such, a network entity 105 may configure a different UE 115, which may be referred to as a helper UE 115, to transmit via uplink to activate the RF device for backscattering to the reader UE 115. For example, the RF device may rely on absorbed incident power from received communications to provide backscattered communications to the reader UE 115 and as such, when the reader UE 115 is a half-duplex device, a helper UE 115 may be used to provide the incident power.

In bi-static reading, two UEs 115 may participate in communications with one or more RFID tags. For example, a carrier emitter as an RF source (e.g., helper UE 115) may provide incident power to the RF device via a forward link. The RF device may absorb the incident power, the absorbed power represented by "$P_{scatt\text{-}tag(dB)}$." The RF device may backscatter power via a backscatter link to the reader UE 115 over a distance $r_{backscatter(m)}$, the backscattered power referred to as "$P_{tag\text{-}scatt(dB)}$." The reader UE 115 may receive the backscatter power as $P_{RX\text{-}reader(dB)}$.

In an idealized situation, $P_{scatt\text{-}tag(dB)} = P_{absorb\text{-}tag(dB)}$. However, in a practical situation: $P_{scatt\text{-}tag(dB)} = P_{absorb\text{-}tag(dB)} - M_{loss(dB)}$. Further, the received power at the reader is: $P_{RX\text{-}reader(dB)} = P_{scatt\text{-}tag(dB)} + G_{TX\text{-}tag(dB)} + G_{RX\text{-}reader(dB)} - 20 \log 10 f_{(GHz)} - 20 \log_{10} r_{backscatter(m)} - 32.44$ dB, where $P_{RX\text{-}reader(dB)>sensitivity}$ and where, $P_{scatt\text{-}tag(dB)}$ is the transmission power of the RF source of the helper UE 115; $M_{loss(dB)}$ is the energy lost by modulation efficiency; $G_{TX\text{-}tag(dB)}$ is the tag antenna transmit gain; $G_{RX\text{-}reader(dB)}$ is the reader (backscatter receiver) receive antenna gain; backscatter (m) is the backward link distance; and $P_{RX\text{-}reader(dB)}$ is the power received by reader (backscatter receiver).

In some examples, the helper UE 115 and the reader UE 115 may determine to communicate with each other to initiate communication, change transmission parameters with the tags, or change the TDD pattern used for communications (e.g., powerup time, command/query time, response time from RF tag), etc. Additionally, or alternatively, the helper UE 115 and the reader UE 115 may determine to change or switch which tags to read from (e.g., the transmit power of the helper UE 115 may depend on the tag class because an ambient IoT device may use input power to operate) or perform HARQ feedback related to the communications. Thus, a communication link or interface between UEs 115 that has low latency, and that is coherent with the potential link that will be used between UEs 115 and the RF tags (e.g., supporting the same or compatible signals, waveforms, modulations used to communication with tags), may be beneficial.

For example, the reader UE 115 and the helper UE 115 may communicate with each other directly, for example, to start a communication process, change transmission parameters for communications with the tags, or change the TDD pattern they use for communications (e.g., powerup time, command/query time, response time from tag), etc. Thus, a communication link or interface between UEs 115 for communicating data in addition to RF information from the RF device that has low latency and that is coherent with the potential link that may be used between UEs 115 and the tags may be beneficial. In wireless communications system 100, inter-UE sounding reference signal (SRS) measurement may be supported and thus, wireless communications systems 100 may incorporate modulation of uplink OFDM symbols (e.g., such as SRS used for channel sounding (codebook or non-codebook)/SRS used for cross link interference (CLI) measurement/physical uplink shared channel (PUSCH)/physical uplink control channel (PUCCH)) for communications between a helper UE 115 and a reader UE 115.

For example, the helper UE 115 may receive, from the reader UE 115, a capability message indicating that the reader UE 115 is capable of processing one or more types of modulated waveforms. The helper UE 115 may encode a set of OFDM symbols with a first set of data for an uplink transmission to a network entity 105 via a communication link between the helper UE 115 and the network entity 105. The helper UE 115 may modulate, based on the capability message and on the encoding, the set of encoded OFDM symbols with a second set of data for the reader UE 115 according to a type of the one or more types of modulated waveforms capable of being processed by the reader UE 115. The helper UE 115 may transmit the modulated set of encoded OFDM symbols via the communication link.

The reader UE 115 may monitor for the set of OFDM symbols that is encoded with the first set of data for the uplink transmission from the helper UE 115 to the network entity 105 that is modulated with the second set of data for the reader UE 115 according to the type of the one or more types of modulated waveforms capable of being processed by the reader UE 115. The reader UE 115 may decode the second set of data modulated with the one or more types of modulated waveforms by processing the set of OFDM symbols based on monitoring for the set of OFDM symbols. The reader UE 115 may process the set of OFDM symbols by dropping one or more modulated bits of the set of OFDM symbols encoded with the first set of data.

In some examples, the network entity 105 may transmit, to each of the helper UE 115 and the reader UE 115, an indication of a set of occasions for communicating the one or more types of modulated waveforms. In some such examples, the reader UE 115 may monitor the indicated set of occasions for the set of OFDM symbols that is encoded with the first set of data for the uplink transmission from the helper UE 115 to the network entity 105 that is modulated with the second set of data for the reader UE 115 according to the type of the one or more types of modulated waveforms capable of being processed by the reader UE 115. The network entity 105 may monitor for the set of OFDM symbols that is encoded with the first set of data for the uplink transmission from the helper UE 115 and that is modulated with the second set of data for the reader UE 115 according to the type of one or more types of modulated waveforms capable of being processed by the reader UE 115 based on the indication of the occasions.

The network entity 105 may decode the encoded first set of data by processing the modulated set of encoded OFDM symbols based on the monitoring. In some such examples, the network entity 105 may process the modulated set of encoded OFDM symbols by dropping one or more modulated bits of the second set of data for the reader UE 115 to obtain and decode the bits of the encoded OFDM symbols. As such, the helper UE 115 and the reader UE 115 may communicate via Uu link which may more efficiently utilize resources and conserve power.

Figure 2A:
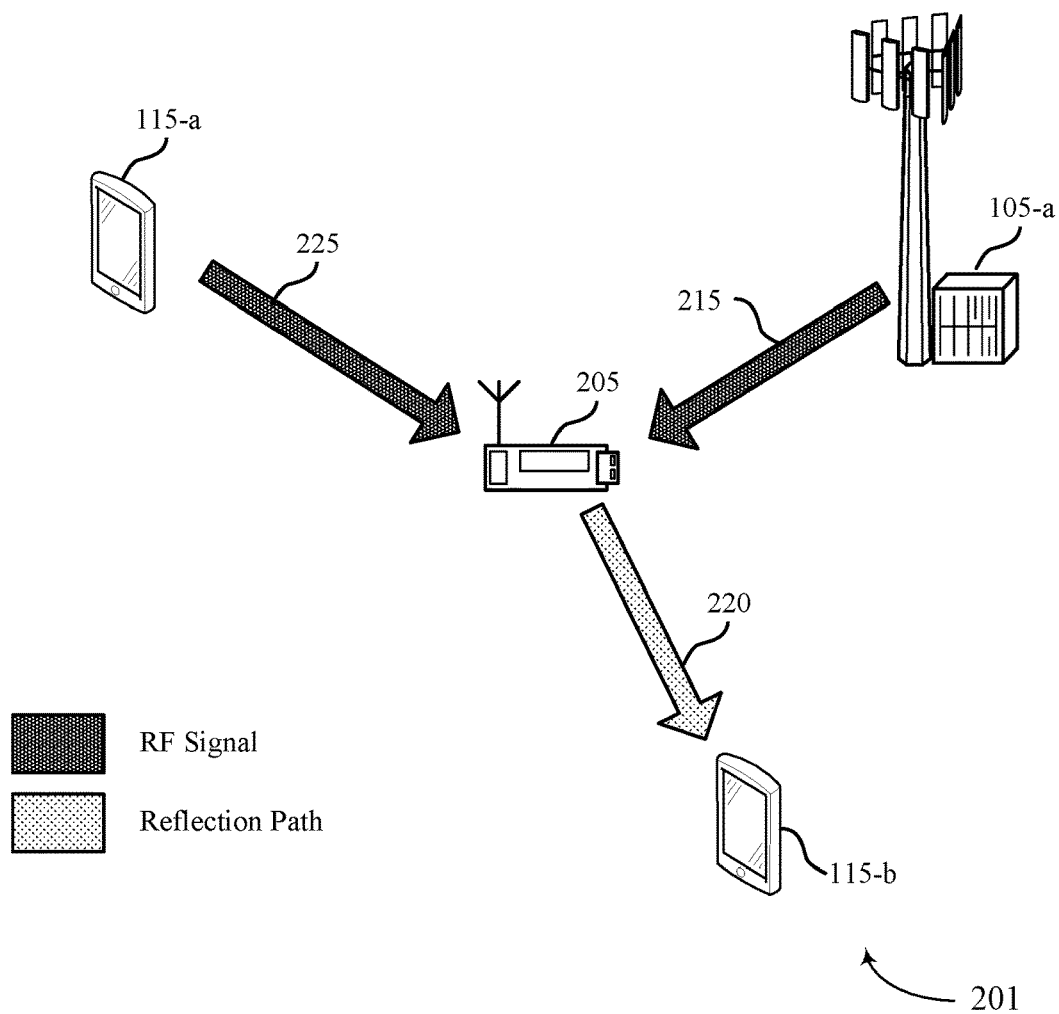
FIG. 2A shows an example of a wireless communications system that supports capability-based modulation of communications between wireless communication devices in accordance with one or more aspects of the present disclosure.

FIG. 2A shows an example of a wireless communications system 201 that supports capability-based modulation of communications between wireless communication devices in accordance with one or more aspects of the present disclosure. In some examples, the wireless communications system 201 may implement aspects of wireless communications system 100 and may include a UE 115-a, a UE 115-b, which may be examples of a UE 115, such as those described with reference to FIG. 1. The wireless communications system 201 may additionally include an RFID device 205 which may be an example of a passive IoT device, an energy harvesting (EH) device, an RF tag, and RFID device, passive wireless device, or the like. Similarly, the wireless communications system 201 may include a network entity 105-a, which may be an example of a network entity 105, a network node, a base station, or any other controlling wireless device, such as those described with reference to FIG. 1.

In some examples, the network entity 105-a may communicate control information, data, or both with the UE 115-a, the UE 115-b, the RFID device 205, or any combination thereof using a downlink communication link (e.g., such as downlink communication link 215). Similarly, the RFID device 205 may communicate data or control signaling with the UE 115-b via a backscatter communication link 220.

In some examples, the UE 115-a, the UE 115-b, or both may be in a static mode of operation, where an RF source is the same device as or a component of a reader device (e.g., the wireless device may have the capability to operate in a full-duplex mode, where transmitting and receiving occur concurrently). In some other examples, the UE 115-a, the UE 115-b, or both may be in a bi-static mode of operation, where the RF source (UE 115-a) is a different device than the reader (UE 115-b).

In the wireless communications system 201, the UE 115-a, the UE 115-b, or both may support RFID technology for identification, tracking, and similar use cases. For example, the UE 115-a, the UE 115-b, or both may communicate with one or more RFID devices, such as the RFID device 205, via a continuous RF waveform. The RFID device 205 may include an RFID tag, which includes an integrated circuit (IC), a rectifier, an energy storage unit, and an antenna, among other components, which may enable the RFID device 205 to transmit data to a reader (e.g., the UE 115-a, the UE 115-b, or both). In some cases, the rectifier may be an EH circuit with a diode and a capacitor that meet an energy conversion efficiency threshold (e.g., 30% energy conversion efficiency).

In some examples, the reader (e.g., the UE 115-a, the UE 115-b, or both) may convert signaling into usable data from the RFID device 205. The wireless communications system 100 may use signaling to activate RFID devices, where the RFID devices may not have a battery, or may have limited energy storage (e.g., capacitors). Additionally, or alternatively, the RFID system may use the signaling for communications with the UE 115-*a*, the UE 115-*b*, or both. For example, the UE 115-*a* may exchange, or transmit, a waveform transmission, which may be a continuous wave RF waveform transmission, using a forward link 225 and a backscatter communication link 220 (e.g., a backward link). The UE 115-*a* may send the waveform transmission according to a given frequency, and the UE 115-*b* may receive a transmission from the RFID device 205 in response to the waveform transmission.

In some cases, communications from the UE 115-*a*, the UE 115-*b*, or both to the RFID device 205 (e.g., an RFID tag) may be referred to as forward link communications and may be sent via a forward link. The forward link communication may be used to power up or activate the RFID device 205 (e.g., by sending one or more unmodulated or modulated signals to provide energy to the RFID device 205), convey commands or information via one or more modulated signals, or provide a backscatter link carrier wave via one or more unmodulated signals. In some other cases, the communication from the RFID device 205 to the UE 115-*a*, the UE 115-*b*, or both may be referred to as backscatter link communications or backward link communications and may be sent via a backscatter link 220. In some examples, the backscatter link 220 may use a backscatter communication technique that provides for a wireless device to communicate without active RF components. For example, the RFID device 205 may not have a power amplifier, a battery, or both, and the backscatter communication techniques may enable the RFID device 205 to harvest energy from a received signal (e.g., when the UE 115-*a*, the UE 115-*b*, or both are within a threshold distance, such as less than 10 meters (m)). The RFID device 205 may use the harvested energy to demodulate a received command and transmit modulated signaling in response. That is, the RFID device 205 may harvest energy from signals (e.g., the forward link communication) over the air to power an IC at the RFID tag.

In some cases, the wireless communications system 201 may include one or more RFID devices (e.g., zero-power devices), such as the RFID device 205, which may be a relatively lightweight IoT device that supports the backscatter communication techniques. The RFID device 205 may additionally, or alternatively, be referred to as a passive device, a passive IoT (P-IoT) device, a zero-power IoT (ZP-IoT) device, semi-passive device, semi-active device, or active device. In some cases, passive devices may not use a power amplifier, a battery, or both while capturing power from the radio wave for performing transmissions. Semi-passive devices may include a battery (e.g., a rechargeable battery) or may be equipped with circuitry configured to harvest energy and store energy from one or more energy sources (e.g., RF signals). Semi-active devices may use active RF components such as a low noise amplifier (LNA), a power amplifier (PA), or both and may use a battery for transmissions. Active devices may use active RF components and generate waveforms or perform transmission techniques and may be classified as IoT devices, where the RF components may use active transmission techniques and may draw power from a battery. In some examples, the semi active devices and active devices may be equipped with a transmitter, a receiver, a power source, or any combination thereof, which may provide for active transmission techniques. The semi-active devices and active devices may use the active transmission techniques to transmit and receive signals (e.g., transmissions, operations, broadcasts) to and from the UE 115-*a*, the UE 115-*b*, or both. In some examples, the devices with passive properties (e.g., passive devices, semi passive devices) may use the backscatter communication techniques for powering components configured to transmit signals in response to the UE 115-*a*, the UE 115-*b*, or both by harvested energy from signals.

The RFID device 205 (e.g., RFID tag(s)) may be, in some examples, a UE that uses an RFID tag radio at low power states, for one or more sleep modes, for one or more RRC states (e.g., during inactive, idle, connected, or any combination thereof), at one or more defined times based on an implementation (e.g., preference) at the RFID device 205 or an indication or agreement from a network entity 105-*a*, or any combination thereof.

In some aspects, backscatter communication techniques may use an interrogator talks first (ITF) procedure between a reader (e.g., the UE 115-*a*, the UE 115-*b*, or both) and the RFID device 205. The ITF procedure may involve a single waveform, which may define the structure and shape of information in transmitted signals. In some examples, the ITF procedure may use a continuous wave, which may be a sinusoidal wave that is modulated with an information bearing signal to convey information. In some cases, the UE 115-*a*, the UE 115-*b*, or both may select a waveform to use to modulate the carrier wave.

In the ITF procedure, the UE 115-*a*, the UE 115-*b*, or both, may transmit a continuous RF wave transmission to the RFID device 205, which may enable the RFID device 205 to collect energy from the continuous wave transmission. The collected energy at the RFID device 205 may reach some voltage (e.g., IC voltage on), at which point the RFID device 205 may turn on (e.g., power up an IC). In some cases, the continuous wave transmission may be transmitted for some duration (e.g., greater than or equal to 400 microseconds (μs)) to power up the RFID device 205. After the duration, the UE 115-*a*, the UE 115-*b*, or both may transmit an information signal (e.g., including one or more commands) to the RFID device 205, where the information signal may also enable the RFID device 205 to harvest energy and remain active (e.g., powered on). The one or more commands may include instructions for the RFID device 205 to transmit some signaling or information requested by the UE 115-*a*, the UE 115-*b*, or both. The UE 115-*a*, the UE 115-*b*, or both (e.g., a reader) may then transmit the continuous wave transmission to maintain the applied power (e.g., powered up) state of the RFID device 205 until the UE 115-*a*, the UE 115-*b*, or both receive a response to the one or more commands. In some aspects, the UE 115-*a*, the UE 115-*b*, or both may operate in a full-duplex communications mode to send the continuous wave transmission to maintain the power at the RFID device 205 while receiving signaling from the RFID device 205 in response to a command. In some cases, powering up the RFID device 205, maintaining the powered-up state of the RFID device 205, and transmitting the power and carrier wave for the tag modulation may use a same waveform.

In some examples, the UE 115-*a*, the UE 115-*b*, or both, the RFID device 205, or both may modulate the waveform transmission, a modulated waveform transmission, or both according to an amplitude shift keying (ASK) modulation scheme. The ASK modulation may be a form of amplitude modulation representing digital data (e.g., 1 s and 0 s, steps, binary) as variations of amplitude in the carrier wave. In some examples, ASK modulation may represent the waveform as a series of bits being shifted repeatedly between high and low amplitudes. As such, the RFID systems may implement ASK modulation for forward link ASK and envelope detection, where a wireless device may use envelope detection to find amplitude variations of an incoming signal and to produce a control signal using the variations. As such, the UE 115-*a*, the UE 115-*b*, or both may use ASK modulation for the waveforms in backscatter communication to provide stable voltage and power in RF communication. For example, ASK modulation may involve square waveforms with digital on and off states, which show distinct time periods of steady communication. In some cases, the UE 115-*a*, the UE 115-*b*, or both, the RFID device 205, or both may modulate the waveform transmission, the modulated waveform transmission, or both according to an ASK state and a defined modulation efficiency, where a first state may include an IC or antenna resistance match for backscatter power and a second state may include an IC or antenna resistance mismatch where there is no backscatter power.

Figure 2B:
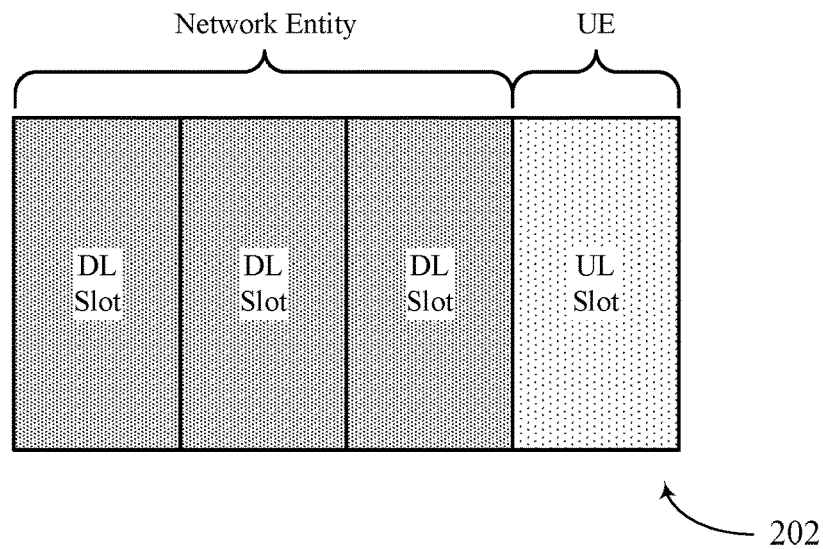
FIG. 2B shows an example of a wireless communication pattern that supports capability-based modulation of communications between wireless communication devices in accordance with one or more aspects of the present disclosure.

FIG. 2B shows an example wireless communication pattern 202 in time that may be implemented by the wireless communications system 201. When the UE 115-*b* is operating as a half-duplex device, the network entity 105-*b* may configure the UE 115-*a* as a helper UE and may allocate uplink resources for communicating a continuous wave during the uplink slots. The reader UE 115-*b* may receive the reflected signal from the helper UE 115-*a*. For example, the network entity 105-*b* may transmit, via downlink communication link 215, a continuous wave via a quantity of downlink slots and the helper UE 115-*a* may transmit, via forward link 225, the continuous wave during the uplink slots. The reader UE 115-*b* may receive the continuous wave via the RFID device 205 (via forward link 225).

The wireless communications system 201 may implement any of the example implementations described with reference to FIGS. 3A through 4B and reference to the devices herein may be with reference to the corresponding helper UE 115-*a*, reader UE 115-*b*, network entity 105-*a*, as described with reference to FIG. 2A.

Figure 3A:
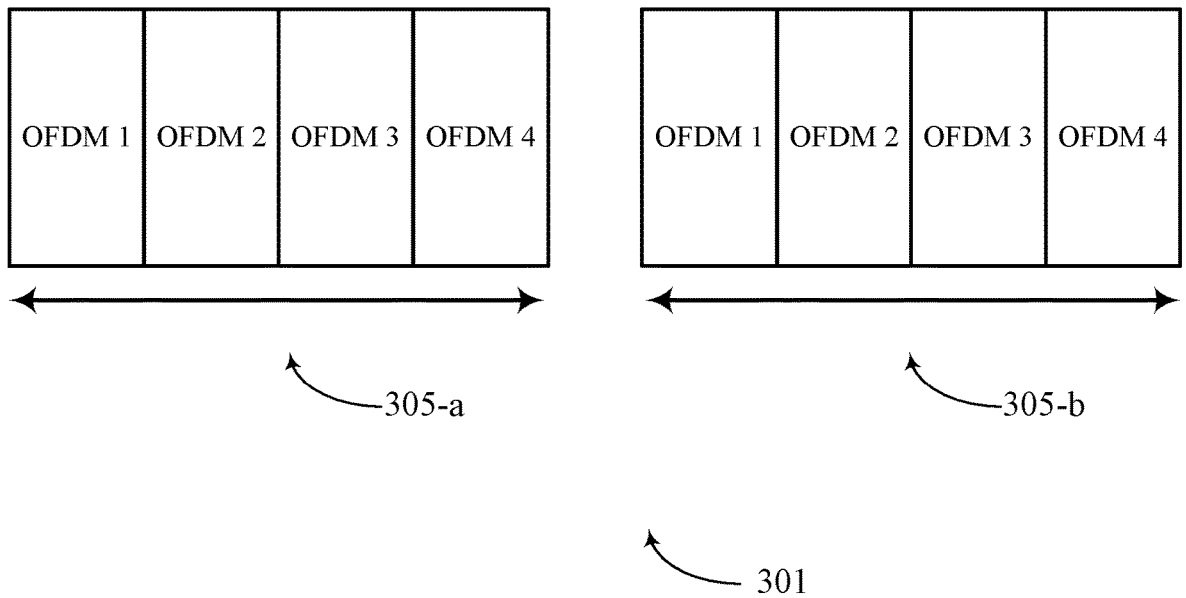
FIGS. 3A & 3B each show an example of a wireless communication pattern that supports capability-based modulation of communications between wireless communication devices in accordance with one or more aspects of the present disclosure.

FIG. 3A shows example wireless communication patterns 301 that supports capability-based modulation of communications between wireless communication devices in accordance with one or more aspects of the present disclosure.

In some examples, the reader UE (e.g., UE 115-*b* as described with reference to FIG. 2A) may transmit an indication of a capability for processing modulated waveforms (e.g., OFDM waveforms including one or more OFDM symbols) using one or more processors or modems. For example, the reader UE may indicate that it is capable of processing one or more of on/off keying-based OFDM waveforms, discrete Fourier transform-based modulated waveforms, Zadoff-Chu modulated waveforms, pulse position modulated waveforms, pulse-width modulated waveforms, pulse-amplitude modulated waveforms, amplitude-shift keying-based modulated waveforms, phase-shift keying-based modulated waveforms, frequency-shift keying-based modulated waveforms, Manchester modulated waveforms, chirp-based modulated waveforms, Walsh modulated waveforms, or the like. For repeated data/SRS/ symbols, this may include a set of orthogonal cover codes encoded or modulated across the repeated symbols, where each orthogonal cover code is interpreted as a sequence of bits. The orthogonal cover mode may include any of the modulation examples provided herein or any other example of an orthogonal cover code not described herein.

For example, the capability of the reader UE may be indicated in one or more of: CapabilityInformation as a response to a CapabilityEnquery; during initial access using msg1/msg3 of a RACH procedure; as part of a new UE class (e.g., then identifying the class (as in previous methods) identifies the capability); dynamic indication using L1/L2/ L3 signaling from the reader UE to network entity or from the reader UE to the helper UE. In some examples, the OFDM symbol may be multiplied or modulated with a sequence of complex or real numbers. As such, similar to some UE CLI processes, the UE may read the time domain signal that was multiplied, e.g., x(n)*s(n), where x(n) is CLI SRS OFDM symbol and s(n) is signal dedicated to the other UE.

In some examples, the capability for processing modulated waveforms may be associated with UEs that support CLI measurements (e.g., CLI SRS RSRP) to support modulated UL symbols capability. The additional processing for decoding modulated signals by another UE may be limited, (e.g., may only be additional for decoding), if the UE is already receiving SRS from a UE.

In some examples, the network entity may configure SRS/CLI SRS/PUSCH/PUCCH monitoring occasions for the UEs, where an SRS/CLI SRS/PUSCH/PUCCH transmitting helper UE may send the SRS/CLI SRS/PUSCH/ PUCCH, then the SRS/CLI SRS/PUSCH/PUCCH receiving reader UE may decode the signal, accordingly, using digital processing (e.g., in time or frequency domain), or may implement an envelope/energy detection (e.g., in on/off keying or envelop detection schemes). In some examples, both UEs may monitor the same occasions. Further, the transmitting helper UE may be configured with many occasions/grants etc. but a subset of them may be monitored by the other UE and may be used for communication.

For example, the wireless communication pattern 301 illustrates an example of four repeated symbols (e.g., SRS, CLI SRS, PUCCH, PUSCH symbols, or any combination thereof) including a first repetition 305-*a* and a second repetition 305-*b* that may be transmitted by a helper UE (e.g., UE 115-*a* as described with reference to FIG. 2A), in which a size four time-domain orthogonal cover code may be used to deliver two bits of data, e.g., e.g., [1 1 1 1] or [1 −1 1 −1] or [1 1 −1 −1] or [1 −1 −1 1]. The reader UE may receive the modulated symbols and may determine the OCC (e.g., on/off keying-based OFDM, discrete Fourier transform-based modulation, Zadoff-Chu modulation, pulse position modulation, pulse-width modulation, pulse-amplitude modulation, amplitude-shift keying-based modulation, phase-shift keying-based modulation, frequency-shift keying-based modulation, Manchester modulation, chirp-based modulation, Walsh modulation) to determine whether the delivered bits include 00, 10, 01, or 11.

In some examples, if the first repetition 305-*a* and second repetition 305-*b* include SRS symbols using a single port and multiple repetitions, or PUCCH symbols (e.g., format 1), then time-domain orthogonal cover codes may be utilized. For example, a network entity (e.g., network entity 105-*a* as described with reference to FIG. 2A) may assign a set of orthogonal cover codes to the helper UE and the reader UE, e.g., like a codebook. The set of orthogonal cover codes may include a set of indices from the types of modulation (e.g., on/off keying-based OFDM, discrete Fourier transform-based modulation, Zadoff-Chu modulation, pulse position modulation, pulse-width modulation, pulse-amplitude modulation, amplitude-shift keying-based modulation, phase-shift keying-based modulation, frequency-shift keying-based modulation, Manchester modulation, chirp-based modulation, Walsh modulation) having a codebook length depending on the number or quantity of SRS repetitions. The helper UE, based on a quantity of bits for communicating to the reader UE, may select an orthogonal cover code. The reader UE may monitor for the backscattered SRS repetitions and may determine which orthogonal cover code was selected by the helper UE in order to decode the quantity of bits.

In some examples, there may be different defined occasions for transmitting one or more SRS/CLI SRS/PUSCH/PUCCH symbols. For example, multiple occasions may be allocated or assigned to each of some combination of SRS, CLI SRS, PUSCH, and PUCCH symbols. For example, there may be different defined occasions for: CSI reports between the helper UE and the reader UE; data for configuring each UE (e.g., data for the helper UE to configure the reader UE or vice versa); power control commands; when the reader UE and the helper UE are providing incident power to a tag; communicating information about reading from one or more RFID tags (e.g., a command to read from a certain tag or tag IDs or tag types/classes, etc.); relayed IQ samples or the payload of tag transmitted from the reader UE (that was operating as an RF reader during the reading process) to the helper UE (e.g., RF source); an indication to stop or terminate reading of RFID tag or termination of a process; an indication to start reading or writing or RFID tags processing session (e.g., a session may include transmitting one or more commands with one or more responses/backscatters/reads from one or more RFID tag(s)); ambient IoT communications (e.g., tag or RFID tag as example).

Figure 3B:
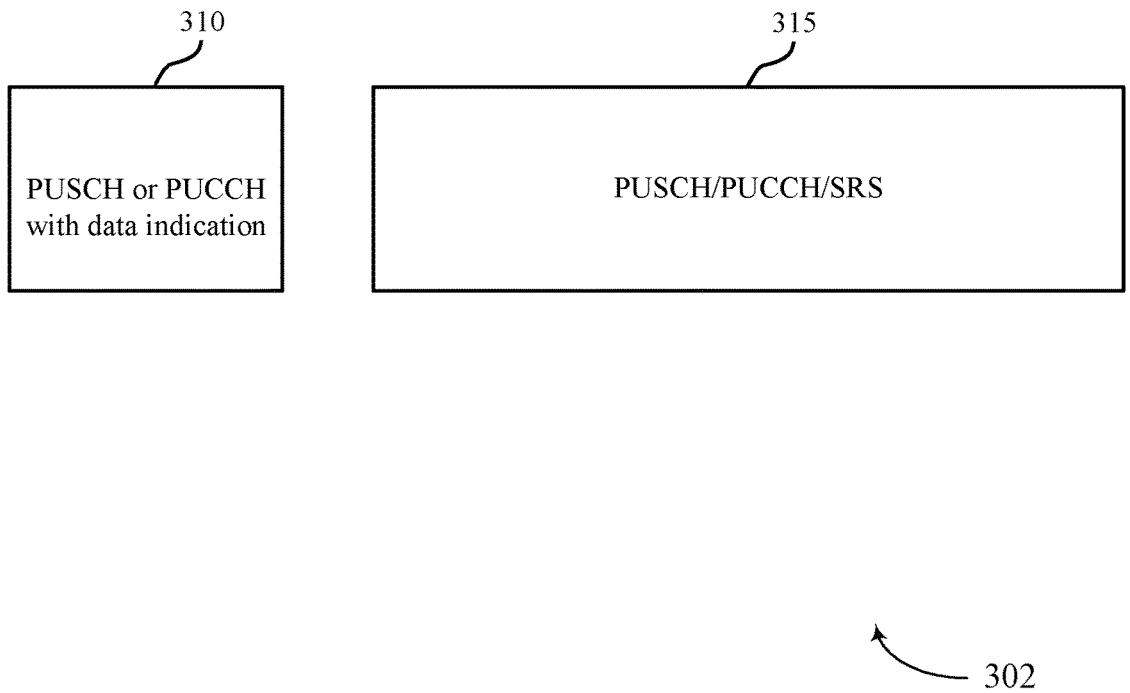

FIG. 3B shows an example of a wireless communication pattern 302 that supports capability-based modulation of communications between wireless communication devices in accordance with one or more aspects of the present disclosure. The wireless communication pattern 302 may include a first uplink communication 310 and a second uplink communication 315.

For PUSCH, PUCCH, or SRS communications, a network entity may use information about the modulation, waveform, and the data to be transmitted to the reader UE for decoding PUSCH, PUCCH, or SRS. For instance, based on the information, the network entity may cancel or drop the data for the reader UE during the decoding of the PUSCH, PUCCH, or SRS. In some examples, for the network entity to remove noise, the helper UE may transmit an indication of the payload (e.g., codebook, modulation, waveform, or any combination thereof) of the reader UE to the network entity via first uplink communication 310 (which may be PUSCH, PUCCH, a shortened PUSCH, or shortened PUCCH). The helper UE may transmit the indication prior to transmitting the modulated and encoded OFDM symbols (e.g., via PUSCH in the example of wireless communication pattern 302) via the dedicated resources such that the network entity may use the information to cancel out the reader UE payload from the modulated and encoded OFDM symbols received by the network entity in second uplink communication 315.

In some examples, if the network entity assigns the waveform, modulation, or coding, etc. (e.g., in case of orthogonal cover codes or on/off keying with Manchester coding, the network entity may assign the orthogonal cover code and may know the generation of the on/off keying within one or more OFDM symbols), the network entity may jointly determine the data transmitted for the network entity (e.g., carried on PUCCH/PUSCH or determined channel through SRS) and the data for the reader UE.

Figure 4A:
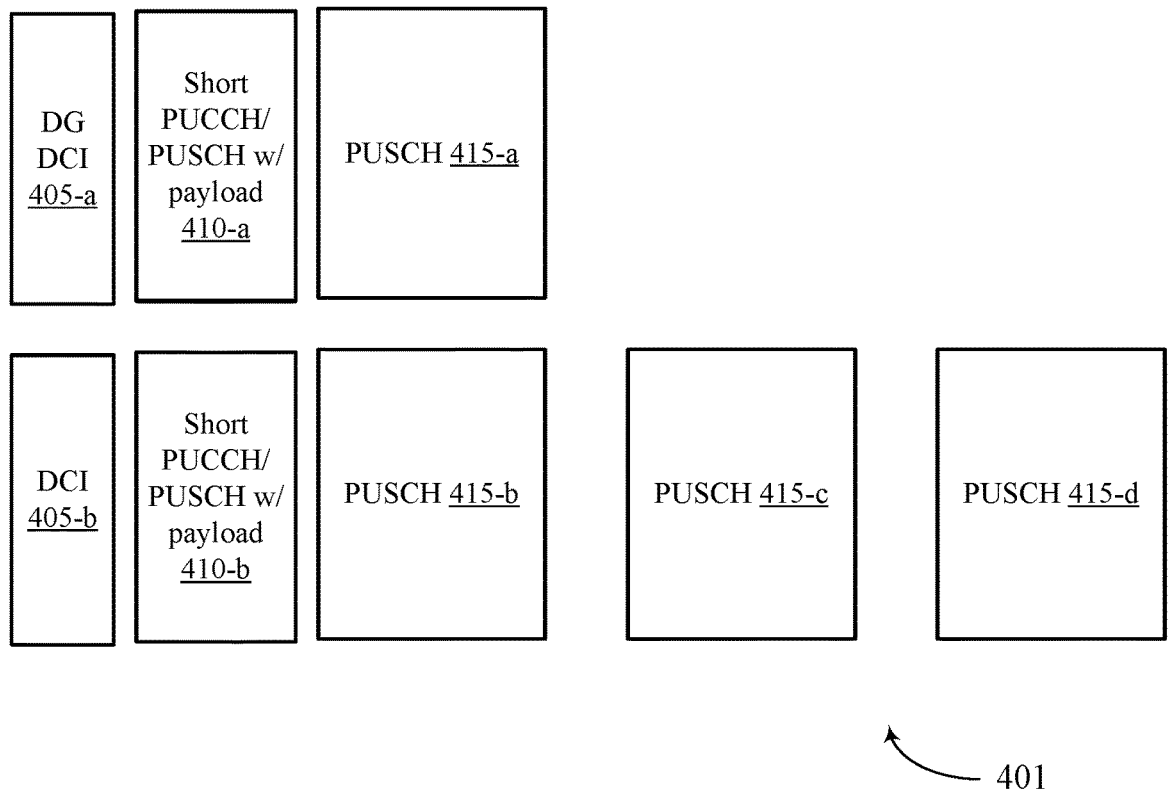
FIGS. 4A and 4B each show an example of a wireless communication pattern that supports capability-based modulation of communications between wireless communication devices in accordance with one or more aspects of the present disclosure.

FIG. 4A shows an example of a wireless communication pattern 401 that supports capability-based modulation of communications between wireless communication devices in accordance with one or more aspects of the present disclosure.

In a first example, dynamic grant DCI 405-*a* or activation DCI 405-*b* (which activates semi-persistent or periodic PUSCH transmissions) in configured grants or in RRC for configured grant type 1, the helper UE may be configured by the network entity to multiplex or modulate data for the reader UE. As such, there might be an indication of other resources to provide in a PUCCH or PUSCH grant to network entity such that the network entity may cancel out the ancillary data (e.g., information related to payload carried from one UE to other and waveform/modulation/coding used). If a PUCCH resource is to be used, then DCI 405-*a* or 405-*b* may indicate the resource and time offset for transmission of the payload. In such cases, two time offsets may be provided, one for PUCCH/PUSCH 410-*a* and PUCCH/PUSCH 410-*b*, and one for PUSCH 415-*a* and PUSCH 415-*b*. PUSCH 415-*c* and PUSCH 415-*d* may be subsequent PUSCH transmissions (e.g., semi-persistent or periodic PUSCH transmissions) that are activated by DCI 405-*b*.

Figure 4B:
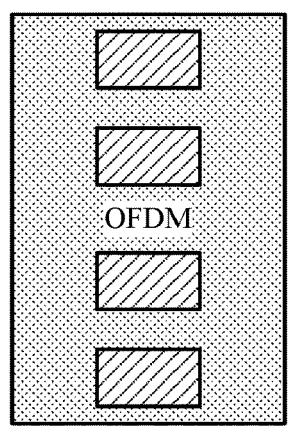
Figure 4B:
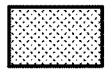
Figure 4B:

FIG. 4B shows an example of a wireless communication pattern 402 that supports capability-based modulation of communications between wireless communication devices in accordance with one or more aspects of the present disclosure. The wireless communication pattern 402 may include an OFDM symbol 420 and a puncturing pattern 425.

In some examples, instead of using an orthogonal cover code to convey the data to the reader UE, for SRS/CLI SRS, there may be multiple defined patterns or scrambling IDs corresponding to certain payloads such that the network entity may detect the channel, and the reader UE may determine the bits corresponding to SRS scrambling ID or sequence.

In some examples, the network entity may define a puncturing pattern 425, in time domain or frequency domain, for delivering payloads or bits that may be known by both UEs. The puncturing may be on a resource element level, resource block level, or resource block group level.

In some examples, to enhance reliability, UEs may use dedicated SRS/CLI SRS or new reference signals, e.g., any Uu-UE reference signal, for synchronization or to acquire CSI between each other. In some examples, there may be a CSI report after such defined reference signal occasions.

Figure 5:
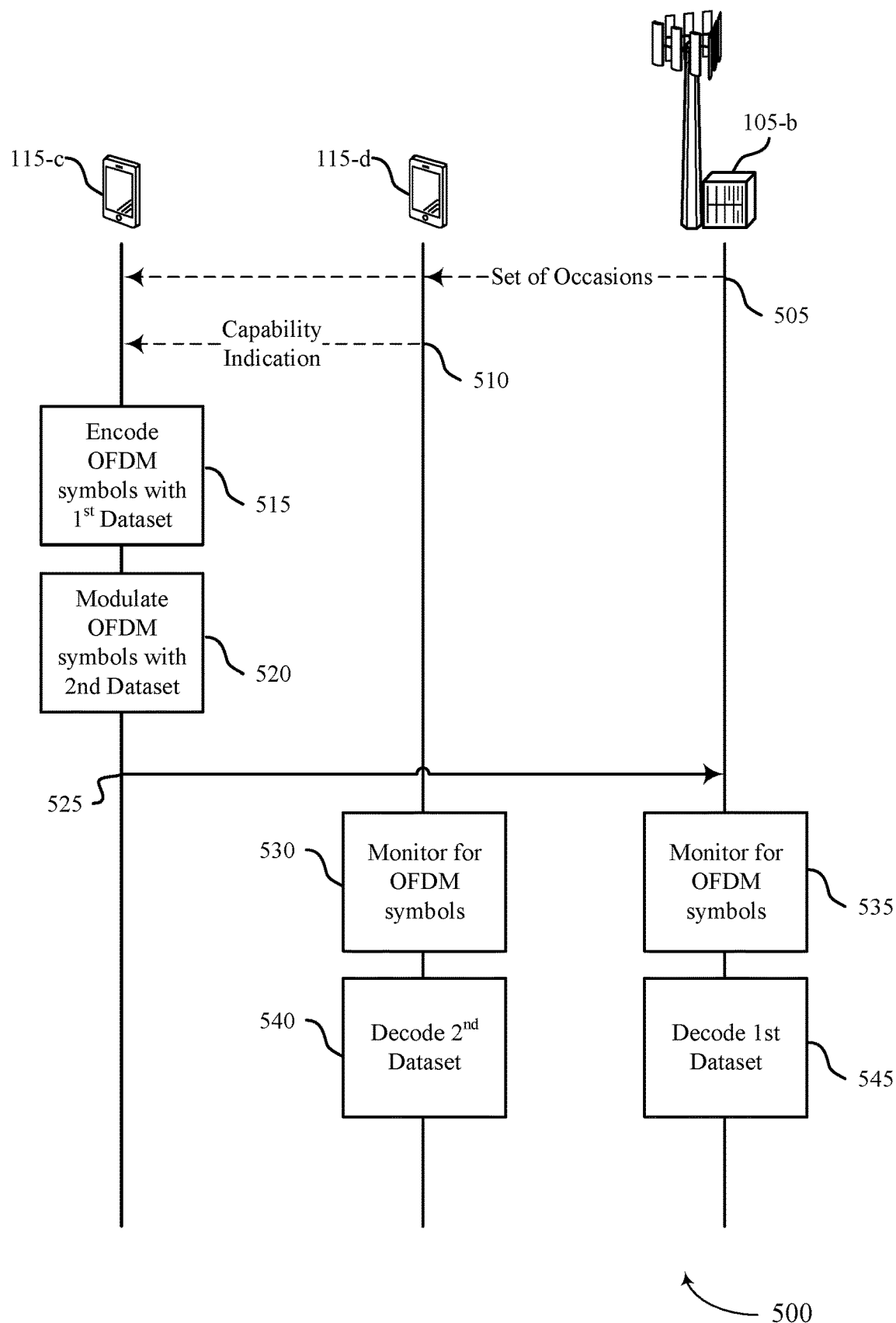
FIG. 5 shows an example of a process flow that supports capability-based modulation of communications between wireless communication devices in accordance with one or more aspects of the present disclosure.

FIG. 5 shows an example of a process flow 500 that supports capability-based modulation of communications between wireless communication devices in accordance with one or more aspects of the present disclosure. In some examples, the process flow 500 may implement aspects of the wireless communications system 100, and the wireless communications system 201. The process flow 500 may illustrate an example of one or more wireless devices, such as a UE 115-*c*, a UE 115-*d*, and a network entity 105, such as those described with reference to FIGS. 1 and 2. Alternative examples of the following may be implemented, where some processes are performed in a different order than described or are not performed. In some cases, processes may include additional features not mentioned below, or further processes may be added.

At 505, the network entity 105-*b* may transmit, to each of the UE 115-*c* and the UE 115-*d*, an indication of a set of occasions for communicating one or more types of modulated waveforms. In some examples, at least one occasion of the set of occasions is dedicated for one or more of a channel sate information report between the UE 115-*c* and the UE 115-*d*, configuration information between the UE 115-*c* and the UE 115-*d*, power control information between the UE 115-*c* and the UE 115-*d*, RF tag information, or any combination thereof.

In some examples, the network entity 105-*b* may additionally or alternatively transmit to the UE 115-*c* a control signal indicating one or more parameters for a set of orthogonal cover codes for encoding a set of OFDM symbols with a second set of data for the UE 115-*d* in accordance with an orthogonal cover code of the set of orthogonal cover codes. In some examples, the network entity 105-*b* may transmit, to the UE 115-*c*, a grant comprising an indication to modulate the set of encoded OFDM symbols with the second set of data for the UE 115-*d* and indicating a first plurality of resources for communicating with the network entity 105-*b* and indicating a second set of resources for transmitting the second set of data to the network entity 105-*b*.

In some examples, the network entity 105-*b* may transmit downlink control information comprising the indication, a first timing offset for transmitting the second set of data, and a second timing offset for transmitting the modulated set of encoded OFDM symbols to the network entity 105-*b*. In some examples, the network entity 105-*b* may transmit, to the UE 115-*c*, control signaling indicating a puncturing pattern for encoding the set of OFDM symbols with the second set of data.

In some examples, the network entity 105-*b* may transmit to the network entity 105-*b*, a control signal indicating one or more parameters for a set of orthogonal cover codes and apply the one or more parameters to the set of OFDM symbols as part of encoding the second set of data in accordance with an orthogonal cover code of the set of orthogonal cover codes at 515.

In some examples, the UE 115-*c* may receive, from the network entity 105-*b*, a grant comprising an indication to modulate the set of encoded OFDM symbols with the second set of data for the UE 115-*d* and indicating a first plurality of resources for communicating with the network entity 105-*b* and indicating a second set of resources for transmitting the second set of data to the network entity 105-*b*.

At 510, the UE 115-*c* may receive, from a UE 115-*d*, a capability message indicating that the UE 115-*d* is capable of processing one or more types of modulated waveforms. In some examples, receiving the capability message is in response to transmitting a capability enquiry message to the UE 115-*d*. In some examples, the capability message is received via a random access channel message 1, a random access channel message 3, a UE class indication, a layer 1 message, a layer 2 message, or a layer 3 message, or any combination thereof.

In some examples, the UE 115-*c* and UE 115-*d* may perform a synchronization procedure using a set of dedicated reference signal resources via a UE-to-network air interface (e.g., Uu interface).

At 515, the UE 115-*c* may encode a set of OFDM symbols with a first set of data for an uplink transmission to the network entity 105-*b* via a communication link between the UE 115-*c* and the network entity 105-*b*. In some examples, encoding the set of OFDM symbols with a first set of data includes encoding a set of bits associated with an SRS, a PUSCH, or a PUCCH.

At 520, the UE 115-*c* may modulate, based on the capability message and on the encoding, the set of encoded OFDM symbols with a second set of data for the UE 115-*d* according to a type of the one or more types of modulated waveforms capable of being processed by the UE 115-*d*. In some examples, modulating the set of encoded OFDM symbols with the second set of data includes modulating the set of encoded OFDM symbols with a set of orthogonal cover codes indicating the second set of data. In some examples, modulating the set of encoded OFDM symbols with the second set of data includes modulating the set of encoded OFDM symbols with the second set of data comprising one or more of a pattern identification, a sequence identification, or a scrambling identification, corresponding to the second set of data.

In some examples, the one or more types of modulated waveforms comprises on/off key-based orthogonal frequency-division multiplexing waveforms, discrete Fourier transform-based modulated waveforms, Zadoff-Chu modulated waveforms, pulse position modulated waveforms, pulse-width modulated waveforms, pulse-amplitude modulated waveforms, amplitude-shift keying-based modulated waveforms, phase-shift keying-based modulated waveforms, frequency-shift keying-based modulated waveforms, Manchester modulated waveforms, chirp-based modulated waveforms, Walsh modulated waveforms, or any combination thereof.

At 525, the UE 115-*c* may transmit the modulated set of encoded OFDM symbols via the communication link. In some examples, the communication link comprises a UE-to-network air interface. In some examples, the UE 115-*c* may transmit, to the network entity 105-*b*, an indication of the second set of data prior to transmitting the modulated set of encoded OFDM symbols via the communication link at 525.

At 530, the UE 115-*d* may monitor for the set of OFDM symbols that is encoded with the first set of data for the uplink transmission from the UE 115-*c* to the network entity 105-*b* that is modulated with the second set of data for the UE 115-*d* according to the type of the one or more types of modulated waveforms capable of being processed by the UE 115-*d*.

At 535, the network entity 105-*b* may monitor for the set of OFDM symbols that is encoded with the first set of data for the uplink transmission from the UE 115-*c* and that is modulated with the second set of data for the UE 115-*d* according to the type of one or more types of modulated waveforms capable of being processed by the UE 115-*d* based on the transmitted indication at 505.

At 540, the UE 115-*d* may decode the second set of data modulated with the one or more types of modulated waveforms by processing the set of OFDM symbols based at least in part on monitoring for the set of OFDM symbols.

Figure 6:
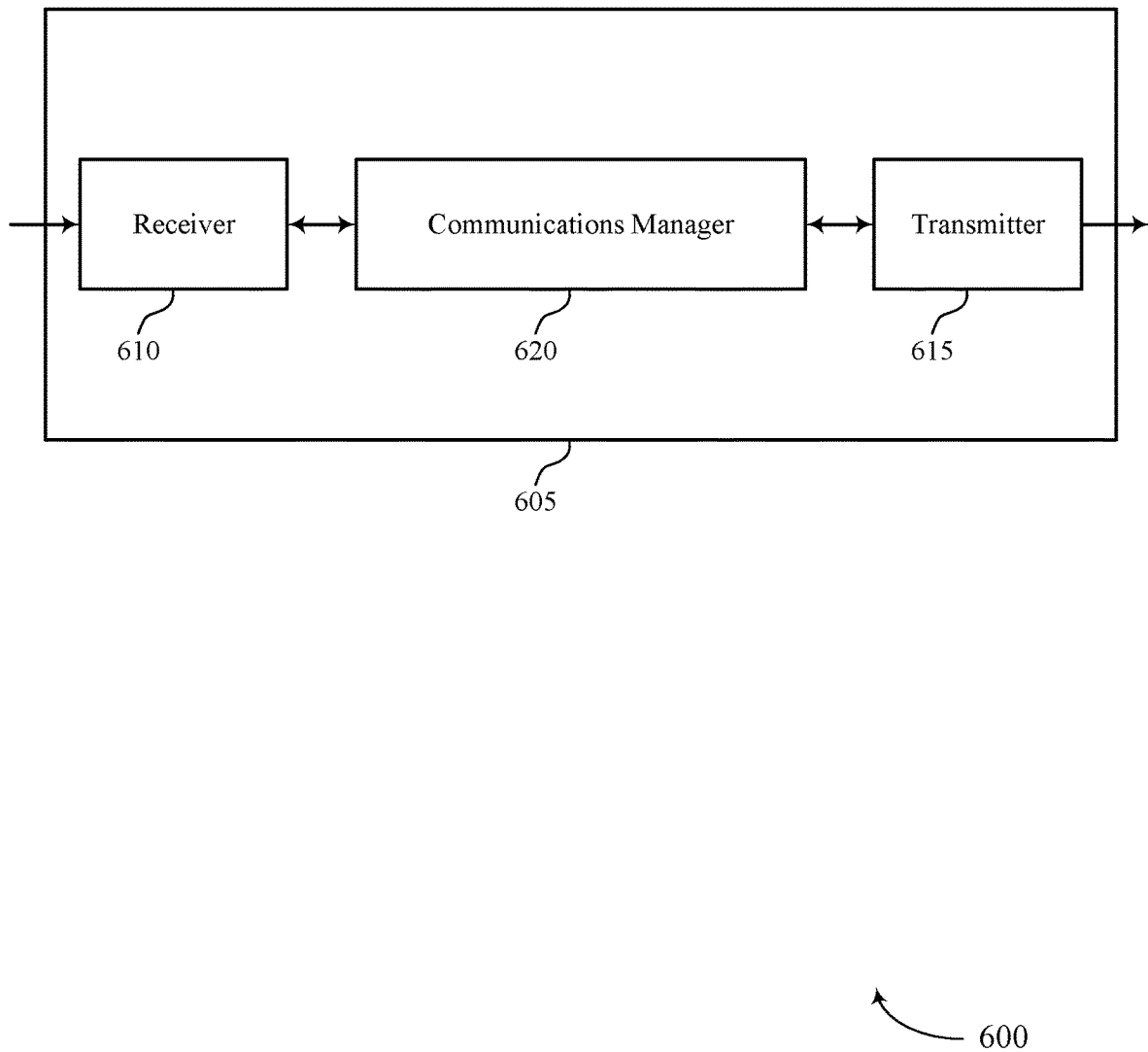
FIGS. 6 and 7 show block diagrams of devices that support capability-based modulation of communications between wireless communication devices in accordance with one or more aspects of the present disclosure.

In some examples, the UE 115-*d* mat process the OFDM symbols by dropping one or more modulated bits of the set of OFDM symbols encoded with the first set of data. In some examples, the UE 115-*d* may process the set of OFDM symbols using a set of orthogonal cover codes of the modulated set of OFDM symbols, wherein the set of orthogonal cover codes carries the second set of data At 545, the network entity 105-*b* may decode the encoded first set of data by processing the modulated set of encoded OFDM symbols based on the monitoring at 535. In some examples, the network entity 105-*b* may process the OFDM symbols by dropping one or more modulated bits of the second set of data for the UE 115-*d* to obtain or decode the encoded bits of the OFDM symbols. In some examples, dropping the one or more modulated bits may be based on receiving an indication of the second set of data from the UE 115-*c*. In some examples, the network entity 105-*b* may decode the second set of data jointly with the first set of data based at least in part on transmitting the control signal indicating the one or more parameters for the set of orthogonal cover codes FIG. 6 shows a block diagram 600 of a device 605 that supports capability-based modulation of communications between wireless communication devices in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to capability-based modulation of communications between wireless communication devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to capability-based modulation of communications between wireless communication devices). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of capability-based modulation of communications between wireless communication devices as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. For example, the communications manager 620 is capable of, configured to, or operable to support a means for receiving, from a second UE, a capability message indicating that the second UE is capable of processing one or more types of modulated waveforms. The communications manager 620 is capable of, configured to, or operable to support a means for encoding a set of OFDM symbols with a first set of data for an uplink transmission to a network entity via a communication link between the first UE and the network entity. The communications manager 620 is capable of, configured to, or operable to support a means for modulating, based at least in part on the capability message and on the encoding, the set of encoded v symbols with a second set of data for the second UE according to a type of the one or more types of modulated waveforms capable of being processed by the second UE. The communications manager 620 is capable of, configured to, or operable to support a means for transmitting the modulated set of encoded OFDM symbols via the communication link.

Additionally, or alternatively, the communications manager 620 may support wireless communication at a second UE in accordance with examples as disclosed herein. For example, the communications manager 620 is capable of, configured to, or operable to support a means for transmitting, to a first UE, a capability message indicating that the second UE is capable of processing one or more types of modulated waveforms. The communications manager 620 is capable of, configured to, or operable to support a means for monitoring for a set of OFDM symbols that is encoded with a first set of data for an uplink transmission from the first UE to a network entity that is modulated with a second set of data for the second UE according to a type of the one or more types of modulated waveforms capable of being processed by the second UE. The communications manager 620 is capable of, configured to, or operable to support a means for decoding the second set of data modulated with the one or more types of modulated waveforms by processing the set of OFDM symbols based on monitoring for the set of OFDM symbols.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources, among other examples.

Figure 7:
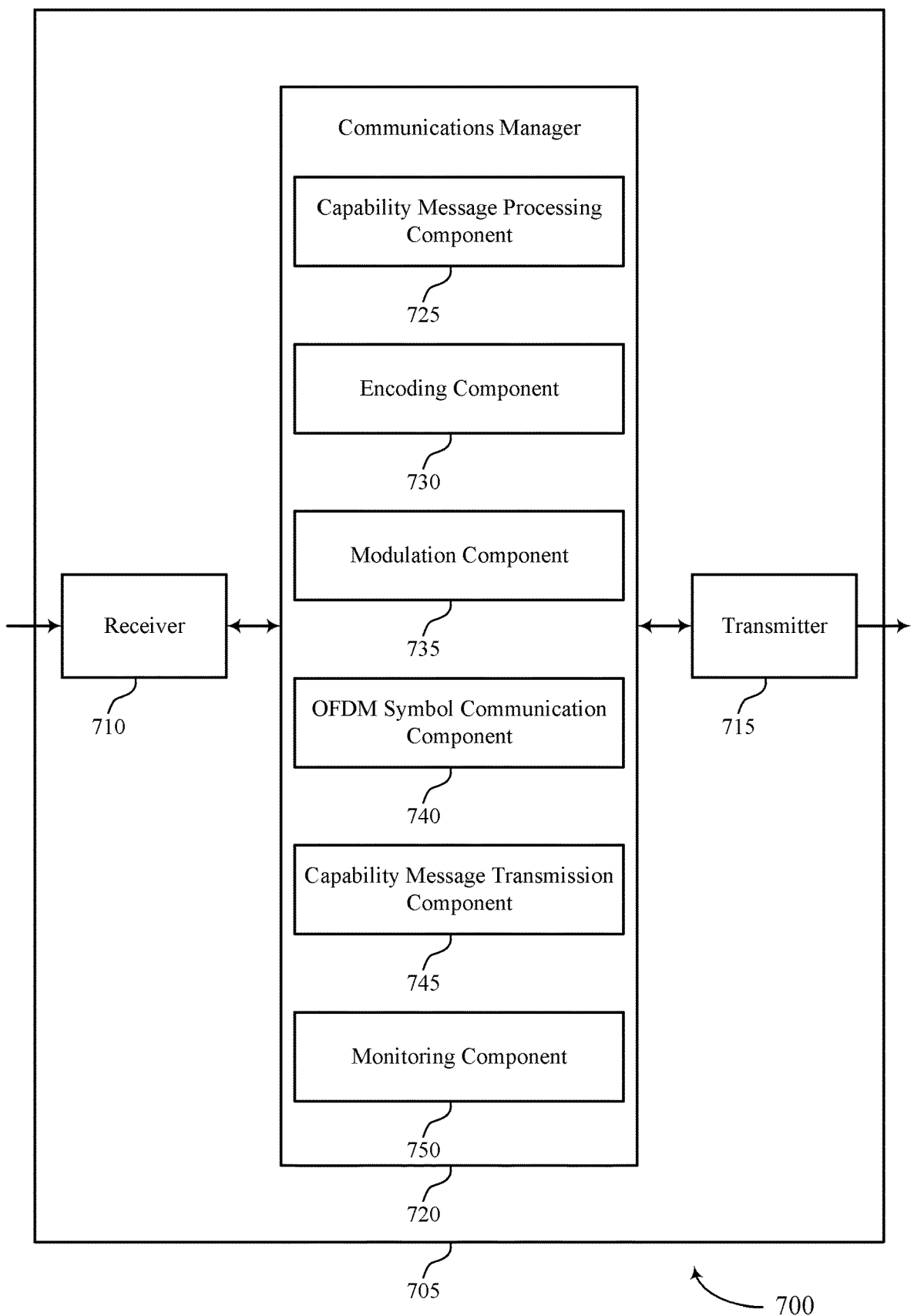

FIG. 7 shows a block diagram 700 of a device 705 that supports capability-based modulation of communications between wireless communication devices in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to capability-based modulation of communications between wireless communication devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to capability-based modulation of communications between wireless communication devices). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of capability-based modulation of communications between wireless communication devices as described herein. For example, the communications manager 720 may include a capability message processing component 725, an encoding component 730, a modulation component 735, an OFDM symbol communication component 740, a capability message transmission component 745, a monitoring component 750, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. The capability message processing component 725 is capable of, configured to, or operable to support a means for receiving, from a second UE, a capability message indicating that the second UE is capable of processing one or more types of modulated waveforms. The encoding component 730 is capable of, configured to, or operable to support a means for encoding a set of OFDM symbols with a first set of data for an uplink transmission to a network entity via a communication link between the first UE and the network entity. The modulation component 735 is capable of, configured to, or operable to support a means for modulating, based on the capability message and on the encoding, the set of encoded OFDM symbols with a second set of data for the second UE according to a type of the one or more types of modulated waveforms capable of being processed by the second UE. The OFDM symbol communication component 740 is capable of, configured to, or operable to support a means for transmitting the modulated set of encoded OFDM symbols via the communication link.

Additionally, or alternatively, the communications manager 720 may support wireless communication at a second UE in accordance with examples as disclosed herein. The capability message transmission component 745 is capable of, configured to, or operable to support a means for transmitting, to a first UE, a capability message indicating that the second UE is capable of processing one or more types of modulated waveforms. The monitoring component 750 is capable of, configured to, or operable to support a means for monitoring for a set of OFDM symbols that is encoded with a first set of data for an uplink transmission from the first UE to a network entity that is modulated with a second set of data for the second UE according to a type of the one or more types of modulated waveforms capable of being processed by the second UE. The OFDM symbol communication component 740 is capable of, configured to, or operable to support a means for decoding the second set of data modulated with the one or more types of modulated waveforms by processing the set of OFDM symbols based on monitoring for the set of OFDM symbols.

Figure 8:
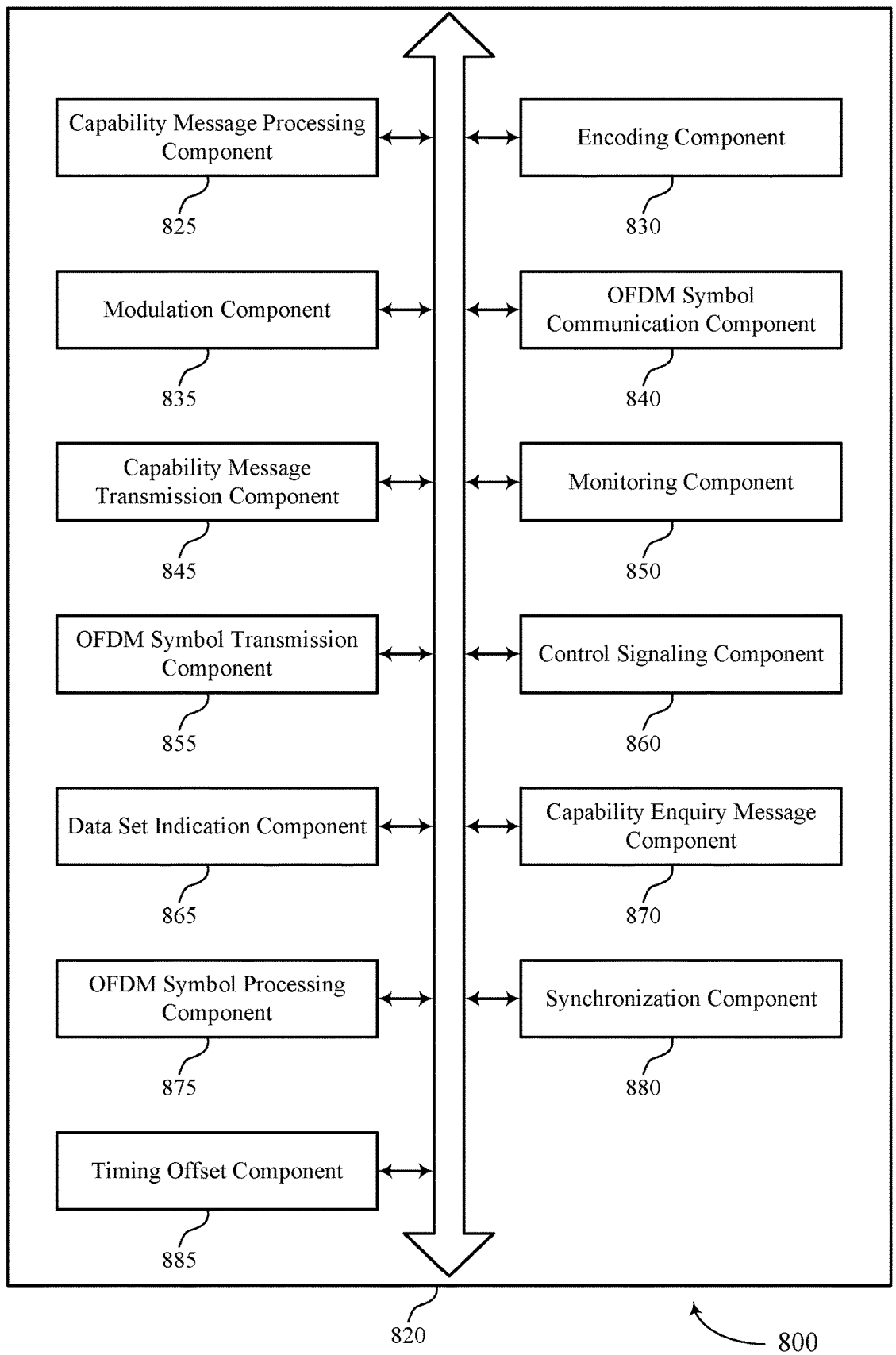
FIG. 8 shows a block diagram of a communications manager that supports capability-based modulation of communications between wireless communication devices in accordance with one or more aspects of the present disclosure.

FIG. 8 shows a block diagram 800 of a communications manager 820 that supports capability-based modulation of communications between wireless communication devices in accordance with one or more aspects of the present disclosure. The communications manager 820 may be an example of aspects of a communications manager 620, a communications manager 720, or both, as described herein. The communications manager 820, or various components thereof, may be an example of means for performing various aspects of capability-based modulation of communications between wireless communication devices as described herein. For example, the communications manager 820 may include a capability message processing component 825, an encoding component 830, a modulation component 835, an OFDM symbol communication component 840, a capability message transmission component 845, a monitoring component 850, an OFDM symbol transmission component 855, a control signaling component 860, a data set indication component 865, a capability enquiry message component 870, an OFDM symbol processing component 875, a synchronization component 880, a timing offset component 885, or any combination thereof. Each of these components may communicate, directly or indirectly, with one another (e.g., via one or more buses).

The communications manager 820 may support wireless communication at a first UE in accordance with examples as disclosed herein. The capability message processing component 825 is capable of, configured to, or operable to support a means for receiving, from a second UE, a capability message indicating that the second UE is capable of processing one or more types of modulated waveforms. The encoding component 830 is capable of, configured to, or operable to support a means for encoding a set of OFDM symbols with a first set of data for an uplink transmission to a network entity via a communication link between the first UE and the network entity. The modulation component 835 is capable of, configured to, or operable to support a means for modulating, based on the capability message and on the encoding, the set of encoded OFDM symbols with a second set of data for the second UE according to a type of the one or more types of modulated waveforms capable of being processed by the second UE. The OFDM symbol communication component 840 is capable of, configured to, or operable to support a means for transmitting the modulated set of encoded OFDM symbols via the communication link.

In some examples, to support transmitting the modulated set of encoded OFDM symbols, the OFDM symbol transmission component 855 is capable of, configured to, or operable to support a means for transmitting the modulated set of encoded OFDM symbols via the communication link to the network entity, where the communication link includes a UE-to-network air interface.

In some examples, the control signaling component 860 is capable of, configured to, or operable to support a means for receiving, from the network entity, an indication of a set of occasions for transmitting the modulated set of encoded OFDM symbols via the communication link, where the set of occasions is for the first UE and the second UE.

In some examples, at least one occasion of the set of occasions is dedicated for one or more of a channel sate information report between the first UE and the second UE, configuration information between the first UE and the second UE, power control information between the first UE and the second UE, RF tag information, or any combination thereof.

In some examples, to support encoding the set of OFDM symbols with the first set of data, the encoding component 830 is capable of, configured to, or operable to support a means for encoding a set of bits associated with an SRS, a PUSCH, or a PUCCH.

In some examples, to support modulating the set of encoded OFDM symbols with the second set of data, the modulation component 835 is capable of, configured to, or operable to support a means for modulating the set of encoded OFDM symbols with a set of orthogonal cover codes indicating the second set of data.

In some examples, to support modulating the set of encoded OFDM symbols with the second set of data, the modulation component 835 is capable of, configured to, or operable to support a means for modulating the set of encoded OFDM symbols with the second set of data including one or more of a pattern identification, a sequence identification, or a scrambling identification, corresponding to the second set of data.

In some examples, the control signaling component 860 is capable of, configured to, or operable to support a means for receiving, from the network entity, a control signal indicating one or more parameters for a set of orthogonal cover codes. In some examples, the encoding component 830 is capable of, configured to, or operable to support a means for applying the one or more parameters to the set of OFDM symbols as part of encoding the second set of data in accordance with an orthogonal cover code of the set of orthogonal cover codes.

In some examples, the control signaling component 860 is capable of, configured to, or operable to support a means for receiving, from the network entity, a grant including an indication to modulate the set of encoded OFDM symbols with the second set of data for the second UE and indicating a first set of multiple resources for communicating with the network entity and indicating a second set of resources for transmitting the second set of data to the network entity.

In some examples, to support receiving the indication, the timing offset component 885 is capable of, configured to, or operable to support a means for receiving downlink control information including the indication, a first timing offset for transmitting the second set of data, and a second timing offset for transmitting the modulated set of encoded OFDM symbols via the communication link.

In some examples, the data set indication component 865 is capable of, configured to, or operable to support a means for transmitting, to the network entity, an indication of the second set of data prior to transmitting the modulated set of encoded OFDM symbols via the communication link.

In some examples, to support receiving the capability message, the capability message processing component 825 is capable of, configured to, or operable to support a means for receiving the capability message via a random access channel message 1, a random access channel message 3, a UE class indication, a layer 1 message, a layer 2 message, or a layer 3 message, or any combination thereof.

In some examples, the capability enquiry message component 870 is capable of, configured to, or operable to support a means for transmitting a capability enquiry message to the second UE, where the capability message is received in response to the capability enquiry message.

In some examples, the one or more types of modulated waveforms includes on/off key-based orthogonal frequency-division multiplexing waveforms, discrete Fourier transform-based modulated waveforms, Zadoff-Chu modulated waveforms, pulse position modulated waveforms, pulse-width modulated waveforms, pulse-amplitude modulated waveforms, amplitude-shift keying-based modulated waveforms, phase-shift keying-based modulated waveforms, frequency-shift keying-based modulated waveforms, Manchester modulated waveforms, chirp-based modulated waveforms, Walsh modulated waveforms, or any combination thereof.

Additionally, or alternatively, the communications manager 820 may support wireless communication at a second UE in accordance with examples as disclosed herein. The capability message transmission component 845 is capable of, configured to, or operable to support a means for transmitting, to a first UE, a capability message indicating that the second UE is capable of processing one or more types of modulated waveforms. The monitoring component 850 is capable of, configured to, or operable to support a means for monitoring for a set of OFDM symbols that is encoded with a first set of data for an uplink transmission from the first UE to a network entity that is modulated with a second set of data for the second UE according to a type of the one or more types of modulated waveforms capable of being processed by the second UE. In some examples, the OFDM symbol communication component 840 is capable of, configured to, or operable to support a means for decoding the second set of data modulated with the one or more types of modulated waveforms by processing the set of OFDM symbols based on monitoring for the set of OFDM symbols.

In some examples, to support processing the set of OFDM symbols, the OFDM symbol processing component 875 is capable of, configured to, or operable to support a means for dropping one or more modulated bits of the set of OFDM symbols encoded with the first set of data.

In some examples, to support processing the set of OFDM symbols, the OFDM symbol processing component 875 is capable of, configured to, or operable to support a means for processing the set of OFDM symbols using a set of orthogonal cover codes of the modulated set of OFDM symbols, where the set of orthogonal cover codes carries the second set of data.

In some examples, the synchronization component 880 is capable of, configured to, or operable to support a means for performing a synchronization procedure with the first UE using a set of dedicated reference signal resources via a UE-to-network air interface.

In some examples, the control signaling component 860 is capable of, configured to, or operable to support a means for receiving, from the network entity, an indication of a set of occasions to monitor for the set of OFDM symbols, where the set of occasions is for the first UE and the second UE.

In some examples, at least one occasion of the set of occasions is dedicated for one or more of a channel sate information report between the first UE and the second UE, configuration information between the first UE and the second UE, power control information between the first UE and the second UE, RF tag information, or any combination thereof.

Figure 9:
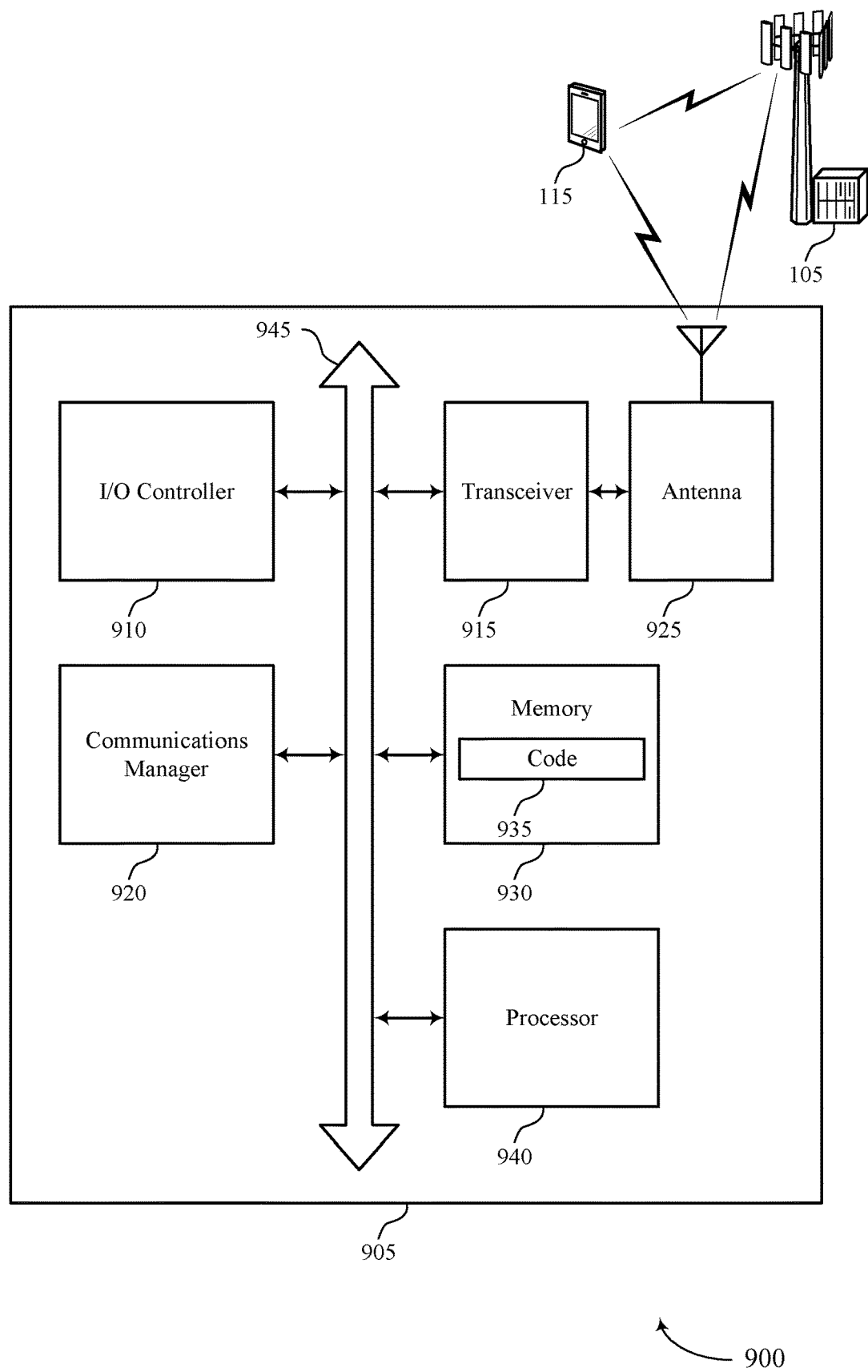
FIG. 9 shows a diagram of a system including a device that supports capability-based modulation of communications between wireless communication devices in accordance with one or more aspects of the present disclosure.

FIG. 9 shows a diagram of a system 900 including a device 905 that supports capability-based modulation of communications between wireless communication devices in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting capability-based modulation of communications between wireless communication devices). For example, the device 905 or a component of the device 905 may include a processor 940 and memory 930 coupled with or to the processor 940, the processor 940 and memory 930 configured to perform various functions described herein.

The communications manager 920 may support wireless communication at a first UE in accordance with examples as disclosed herein. For example, the communications manager 920 is capable of, configured to, or operable to support a means for receiving, from a second UE, a capability message indicating that the second UE is capable of processing one or more types of modulated waveforms. The communications manager 920 is capable of, configured to, or operable to support a means for encoding a set of OFDM symbols with a first set of data for an uplink transmission to a network entity via a communication link between the first UE and the network entity. The communications manager 920 is capable of, configured to, or operable to support a means for modulating, based at least in part on the capability message and on the encoding, the set of encoded OFDM symbols with a second set of data for the second UE according to a type of the one or more types of modulated waveforms capable of being processed by the second UE. The communications manager 920 is capable of, configured to, or operable to support a means for transmitting the modulated set of encoded OFDM symbols via the communication link.

Additionally, or alternatively, the communications manager 920 may support wireless communication at a second UE in accordance with examples as disclosed herein. For example, the communications manager 920 is capable of, configured to, or operable to support a means for transmitting, to a first UE, a capability message indicating that the second UE is capable of processing one or more types of modulated waveforms. The communications manager 920 is capable of, configured to, or operable to support a means for monitoring for a set of OFDM symbols that is encoded with a first set of data for an uplink transmission from the first UE to a network entity that is modulated with a second set of data for the second UE according to a type of the one or more types of modulated waveforms capable of being processed by the second UE. The communications manager 920 is capable of, configured to, or operable to support a means for decoding the second set of data modulated with the one or more types of modulated waveforms by processing the set of OFDM symbols based on monitoring for the set of OFDM symbols.

By including or configuring the communications manager 920 in accordance with examples as described herein, the device 905 may support techniques for reduced latency, improved user experience related to reduced processing, reduced power consumption, more efficient utilization of communication resources, improved coordination between devices, and longer battery life, among other examples.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of capability-based modulation of communications between wireless communication devices as described herein, or the processor 940 and the memory 930 may be otherwise configured to perform or support such operations.

Figure 10:
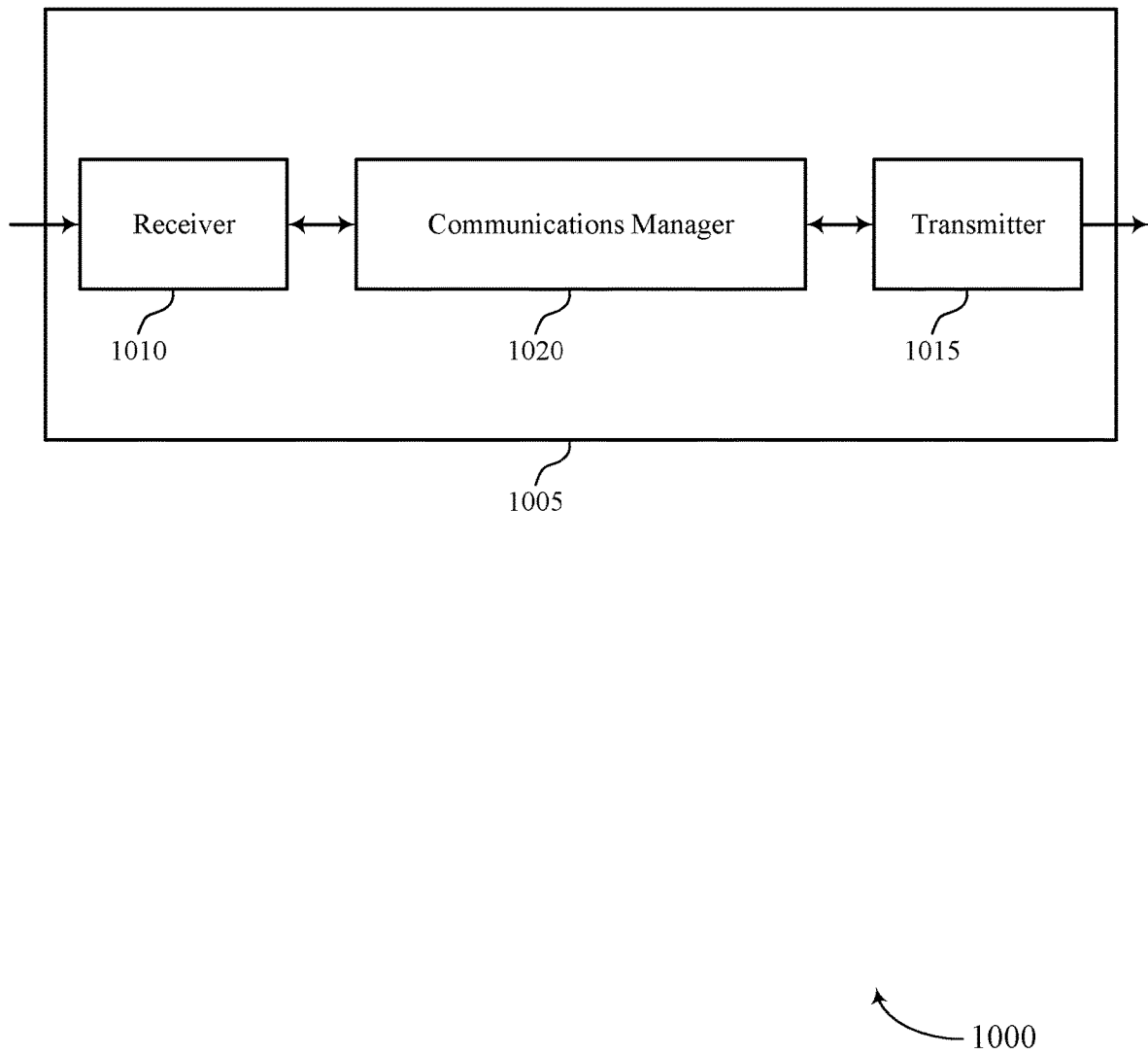
FIGS. 10 and 11 show block diagrams of devices that support capability-based modulation of communications between wireless communication devices in accordance with one or more aspects of the present disclosure.

FIG. 10 shows a block diagram 1000 of a device 1005 that supports capability-based modulation of communications between wireless communication devices in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of capability-based modulation of communications between wireless communication devices as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 is capable of, configured to, or operable to support a means for transmitting, to each of a first UE and a second UE, an indication of a set of occasions for communicating one or more types of modulated waveforms. The communications manager 1020 is capable of, configured to, or operable to support a means for monitoring for a set of OFDM symbols that is encoded with a first set of data for an uplink transmission from the first UE and that is modulated with a second set of data for the second UE according to a type of one or more types of modulated waveforms capable of being processed by the second UE based on the indication. The communications manager 1020 is capable of, configured to, or operable to support a means for decoding the encoded first set of data by processing the modulated set of encoded OFDM symbols based on the monitoring.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources, among other examples.

Figure 11:
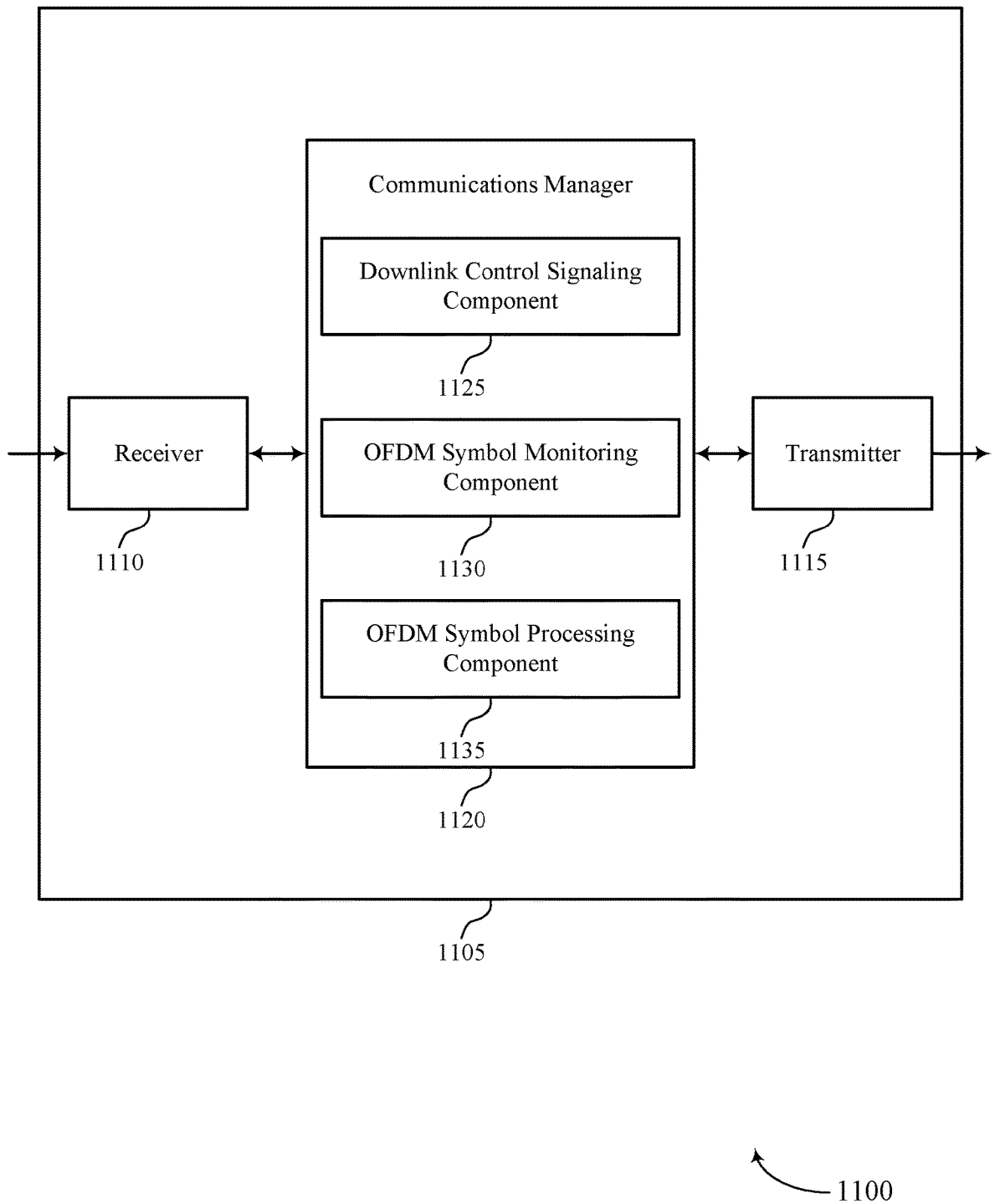

FIG. 11 shows a block diagram 1100 of a device 1105 that supports capability-based modulation of communications between wireless communication devices in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of capability-based modulation of communications between wireless communication devices as described herein. For example, the communications manager 1120 may include a downlink control signaling component 1125, an OFDM symbol monitoring component 1130, an OFDM symbol processing component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both.

For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The downlink control signaling component 1125 is capable of, configured to, or operable to support a means for transmitting, to each of a first UE and a second UE, an indication of a set of occasions for communicating one or more types of modulated waveforms. The OFDM symbol monitoring component 1130 is capable of, configured to, or operable to support a means for monitoring for a set of OFDM symbols that is encoded with a first set of data for an uplink transmission from the first UE and that is modulated with a second set of data for the second UE according to a type of one or more types of modulated waveforms capable of being processed by the second UE based on the indication. The OFDM symbol processing component 1135 is capable of, configured to, or operable to support a means for decoding the encoded first set of data by processing the modulated set of encoded OFDM symbols based on the monitoring.

Figure 12:
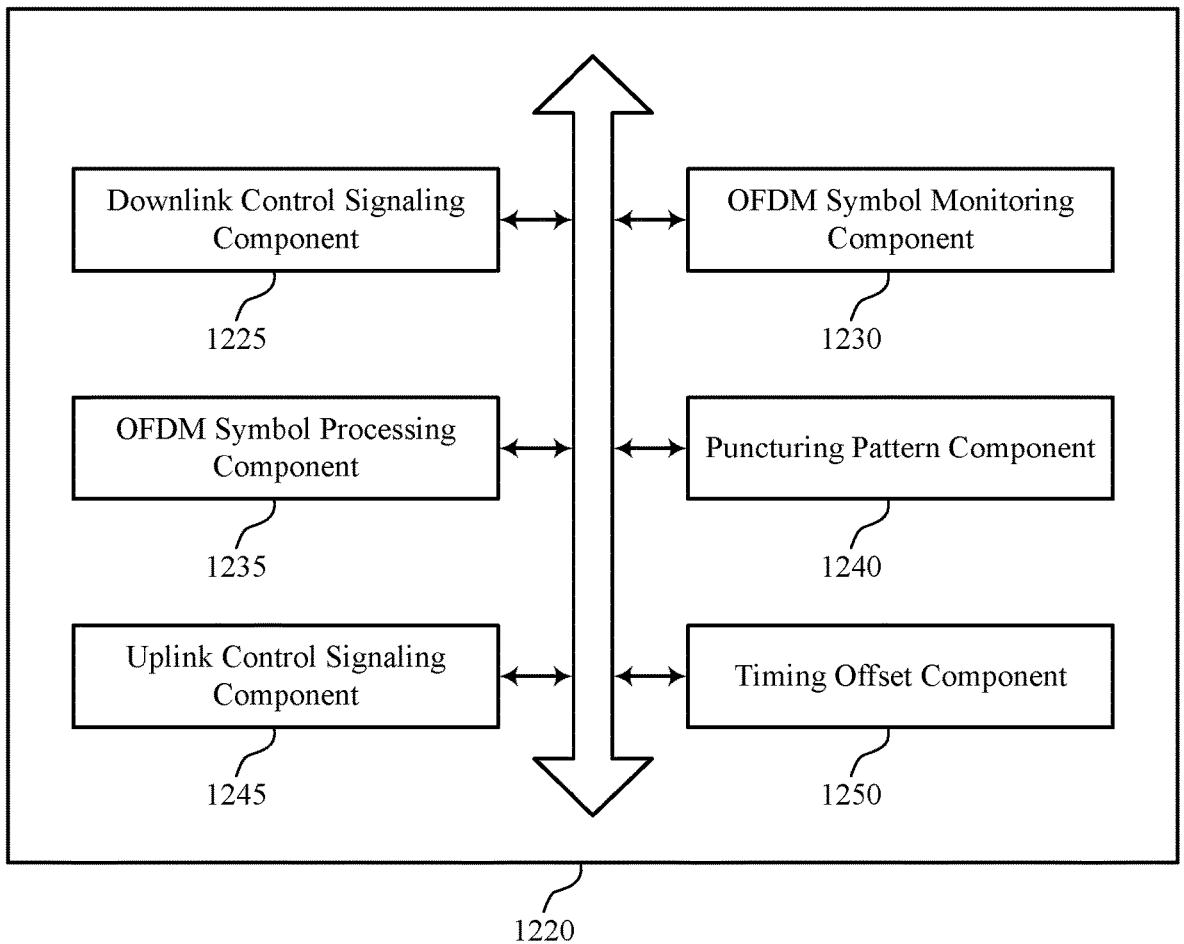
FIG. 12 shows a block diagram of a communications manager that supports capability-based modulation of communications between wireless communication devices in accordance with one or more aspects of the present disclosure.

FIG. 12 shows a block diagram 1200 of a communications manager 1220 that supports capability-based modulation of communications between wireless communication devices in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of capability-based modulation of communications between wireless communication devices as described herein. For example, the communications manager 1220 may include a downlink control signaling component 1225, an OFDM symbol monitoring component 1230, an OFDM symbol processing component 1235, a puncturing pattern component 1240, an uplink control signaling component 1245, a timing offset component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The downlink control signaling component 1225 is capable of, configured to, or operable to support a means for transmitting, to each of a first UE and a second UE, an indication of a set of occasions for communicating one or more types of modulated waveforms. The OFDM symbol monitoring component 1230 is capable of, configured to, or operable to support a means for monitoring for a set of OFDM symbols that is encoded with a first set of data for an uplink transmission from the first UE and that is modulated with a second set of data for the second UE according to a type of one or more types of modulated waveforms capable of being processed by the second UE based on the indication. The OFDM symbol processing component 1235 is capable of, configured to, or operable to support a means for decoding the encoded first set of data by processing the modulated set of encoded OFDM symbols based on the monitoring.

In some examples, to support processing modulated set of encoded OFDM symbols, the OFDM symbol processing component 1235 is capable of, configured to, or operable to support a means for dropping one or more modulated bits of the second set of data for the second UE.

In some examples, the uplink control signaling component 1245 is capable of, configured to, or operable to support a means for receiving, from the first UE, an indication of the second set of data, where dropping the one or more modulated bits is based on receiving the indication.

In some examples, the downlink control signaling component 1225 is capable of, configured to, or operable to support a means for transmitting, to the first UE, a control signal indicating one or more parameters for a set of orthogonal cover codes as part of encoding the set of OFDM symbols with the second set of data in accordance with an orthogonal cover code of the set of orthogonal cover codes.

In some examples, to support processing the modulated set of encoded OFDM symbols, the OFDM symbol processing component 1235 is capable of, configured to, or operable to support a means for decoding the second set of data jointly with the first set of data based on transmitting the control signal indicating the one or more parameters for the set of orthogonal cover codes.

In some examples, the downlink control signaling component 1225 is capable of, configured to, or operable to support a means for transmitting, to the first UE, a grant including an indication to modulate the set of encoded OFDM symbols with the second set of data for the second UE and indicating a first set of multiple resources for communicating with the network entity and indicating a second set of resources for transmitting the second set of data to the network entity.

In some examples, to support transmitting the indication, the timing offset component 1250 is capable of, configured to, or operable to support a means for transmitting downlink control information including the indication, a first timing offset for transmitting the second set of data, and a second timing offset for transmitting the modulated set of encoded OFDM symbols to the network entity.

In some examples, the puncturing pattern component 1240 is capable of, configured to, or operable to support a means for transmitting, to the first UE, control signaling indicating a puncturing pattern for encoding the set of OFDM symbols with the second set of data.

Figure 13:
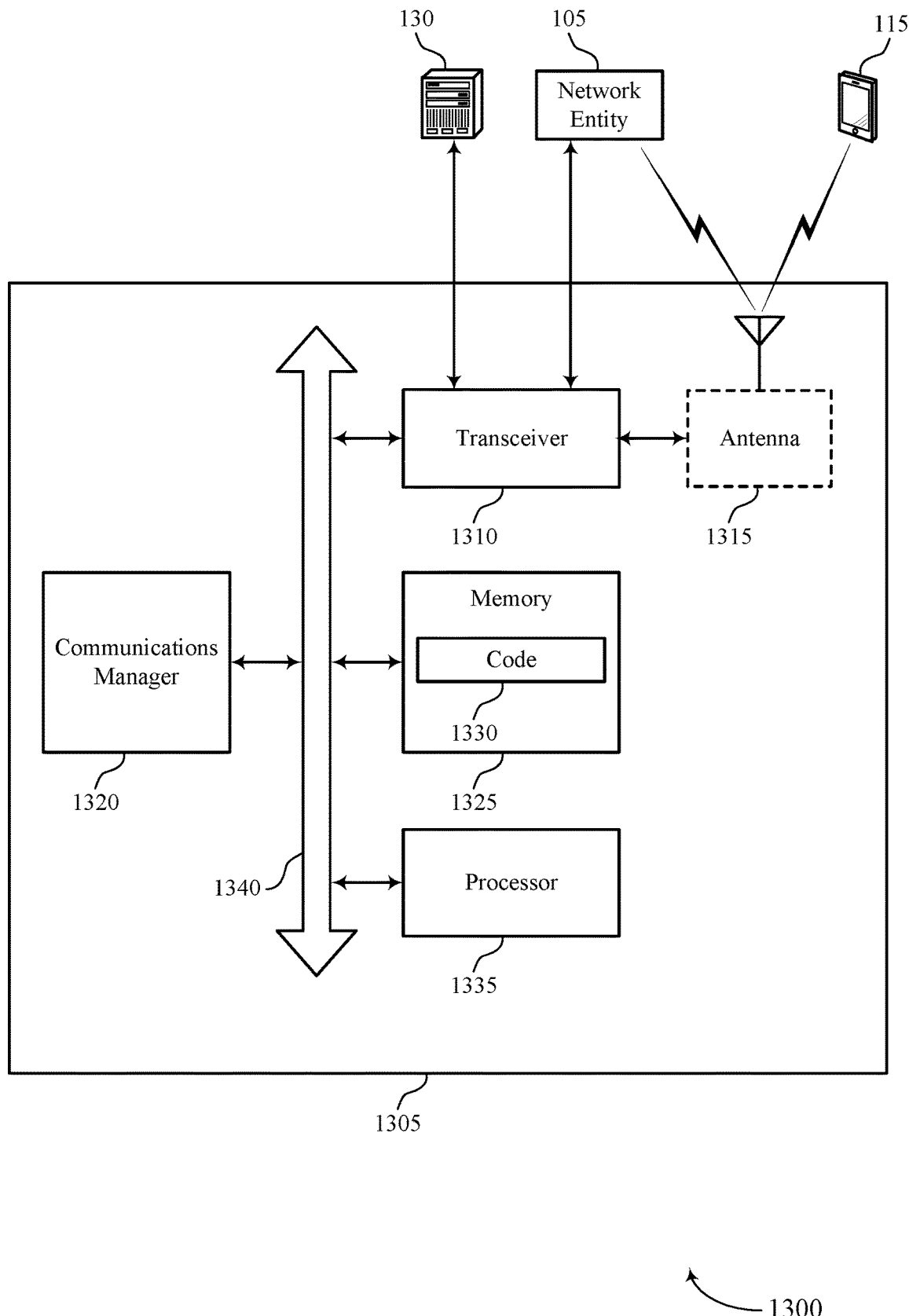
FIG. 13 shows a diagram of a system including a device that supports capability-based modulation of communications between wireless communication devices in accordance with one or more aspects of the present disclosure.

FIG. 13 shows a diagram of a system 1300 including a device 1305 that supports capability-based modulation of communications between wireless communication devices in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting capability-based modulation of communications between wireless communication devices). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 is capable of, configured to, or operable to support a means for transmitting, to each of a first UE and a second UE, an indication of a set of occasions for communicating one or more types of modulated waveforms. The communications manager 1320 is capable of, configured to, or operable to support a means for monitoring for a set of OFDM symbols that is encoded with a first set of data for an uplink transmission from the first UE and that is modulated with a second set of data for the second UE according to a type of one or more types of modulated waveforms capable of being processed by the second UE based on the indication. The communications manager 1320 is capable of, configured to, or operable to support a means for decoding the encoded first set of data by processing the modulated set of encoded OFDM symbols based on the monitoring.

By including or configuring the communications manager 1320 in accordance with examples as described herein, the device 1305 may support techniques for reduced latency, more efficient utilization of communication resources, and improved coordination between devices, among other examples.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of capability-based modulation of communications between wireless communication devices as described herein, or the processor 1335 and the memory 1325 may be otherwise configured to perform or support such operations.

Figure 14:
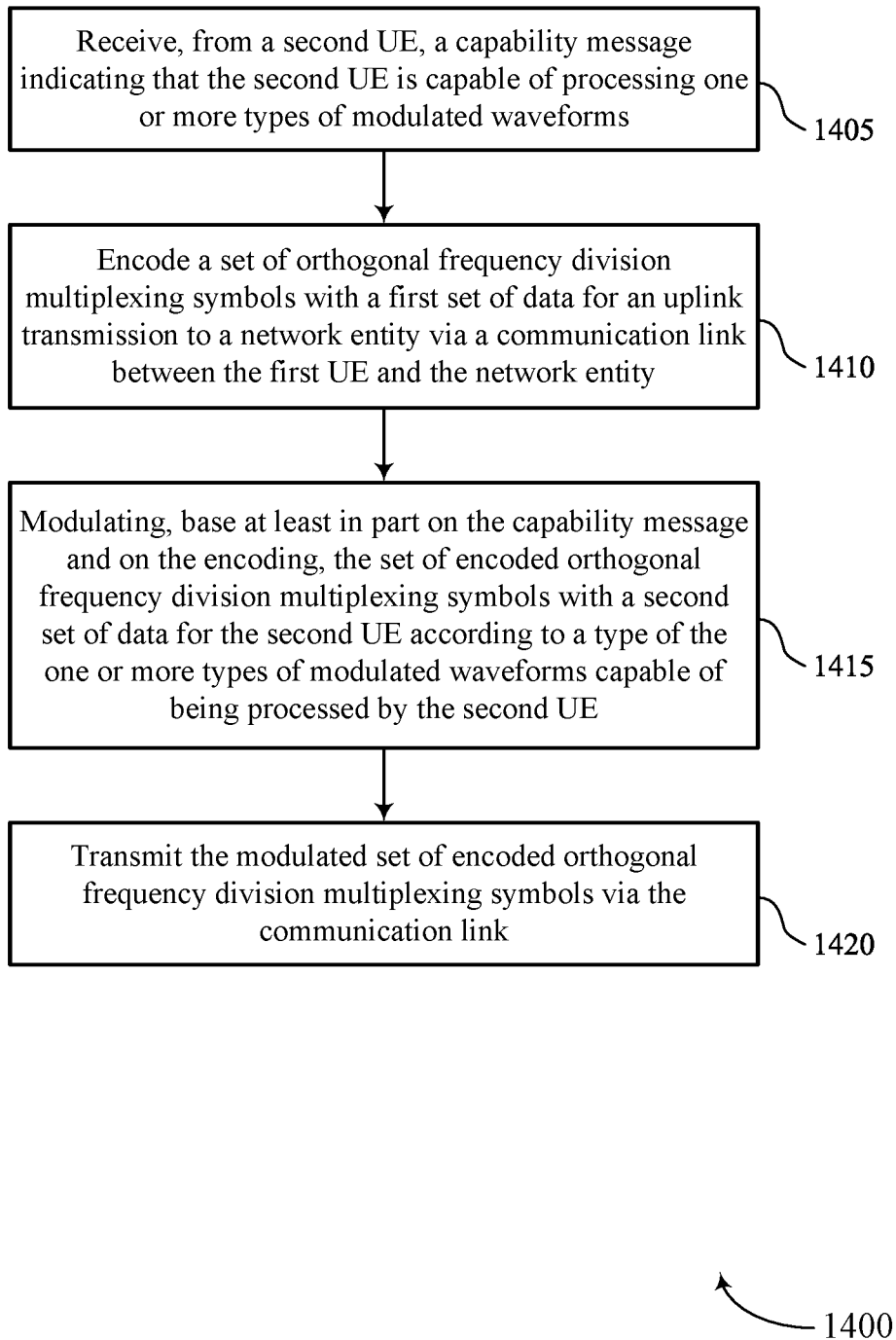
FIGS. 14 through 20 show flowcharts illustrating methods that support capability-based modulation of communications between wireless communication devices in accordance with one or more aspects of the present disclosure.

FIG. 14 shows a flowchart illustrating a method 1400 that supports capability-based modulation of communications between wireless communication devices in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a second UE, a capability message indicating that the second UE is capable of processing one or more types of modulated waveforms. The operations of block 1405 may be performed in accordance with examples as disclosed herein. In some examples, aspects of the operations of 1405 may be performed by a capability message processing component 825 as described with reference to FIG. 8.

At 1410, the method may include encoding a set of OFDM symbols with a first set of data for an uplink transmission to a network entity via a communication link between the first UE and the network entity. The operations of block 1410 may be performed in accordance with examples as disclosed herein. In some examples, aspects of the operations of 1410 may be performed by an encoding component 830 as described with reference to FIG. 8.

At 1415, the method may include modulating, based on the capability message and on the encoding, the set of encoded OFDM symbols with a second set of data for the second UE according to a type of the one or more types of modulated waveforms capable of being processed by the second UE. The operations of block 1415 may be performed in accordance with examples as disclosed herein. In some examples, aspects of the operations of 1415 may be performed by a modulation component 835 as described with reference to FIG. 8.

At 1420, the method may include transmitting the modulated set of encoded OFDM symbols via the communication link. The operations of block 1420 may be performed in accordance with examples as disclosed herein. In some examples, aspects of the operations of 1420 may be performed by an OFDM symbol communication component 840 as described with reference to FIG. 8.

Figure 15:
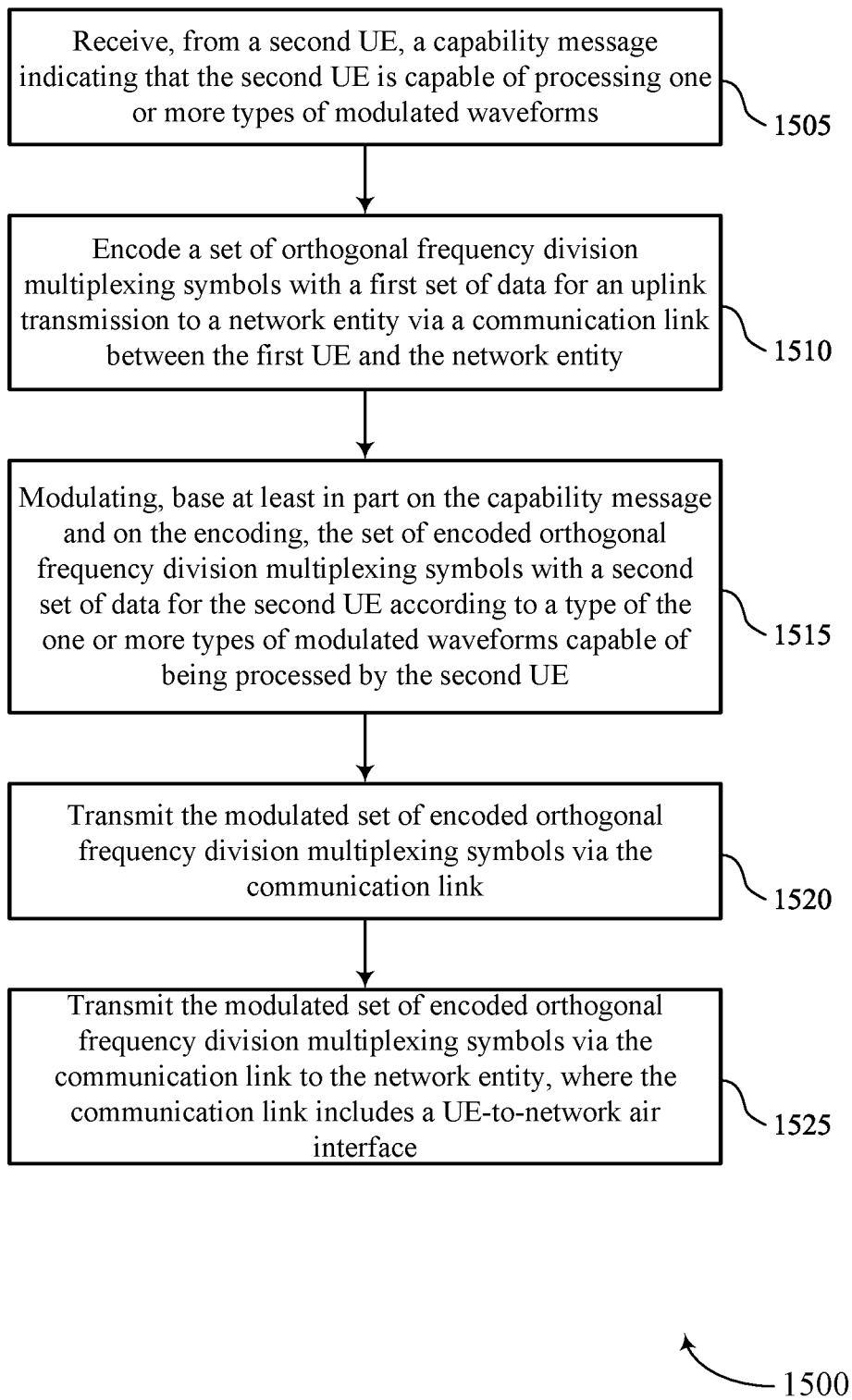

FIG. 15 shows a flowchart illustrating a method 1500 that supports capability-based modulation of communications between wireless communication devices in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a second UE, a capability message indicating that the second UE is capable of processing one or more types of modulated waveforms. The operations of block 1505 may be performed in accordance with examples as disclosed herein. In some examples, aspects of the operations of 1505 may be performed by a capability message processing component 825 as described with reference to FIG. 8.

At 1510, the method may include encoding a set of OFDM symbols with a first set of data for an uplink transmission to a network entity via a communication link between the first UE and the network entity. The operations of block 1510 may be performed in accordance with examples as disclosed herein. In some examples, aspects of the operations of 1510 may be performed by an encoding component 830 as described with reference to FIG. 8.

At 1515, the method may include modulating, based on the capability message and on the encoding, the set of encoded OFDM symbols with a second set of data for the second UE according to a type of the one or more types of modulated waveforms capable of being processed by the second UE. The operations of block 1515 may be performed in accordance with examples as disclosed herein. In some examples, aspects of the operations of 1515 may be performed by a modulation component 835 as described with reference to FIG. 8.

At 1520, the method may include transmitting the modulated set of encoded OFDM symbols via the communication link. The operations of block 1520 may be performed in accordance with examples as disclosed herein. In some examples, aspects of the operations of 1520 may be performed by an OFDM symbol communication component 840 as described with reference to FIG. 8.

At 1525, the method may include transmitting the modulated set of encoded OFDM symbols via the communication link to the network entity, where the communication link includes a UE-to-network air interface. The operations of block 1525 may be performed in accordance with examples as disclosed herein. In some examples, aspects of the operations of 1525 may be performed by an OFDM symbol transmission component 855 as described with reference to FIG. 8.

Figure 16:
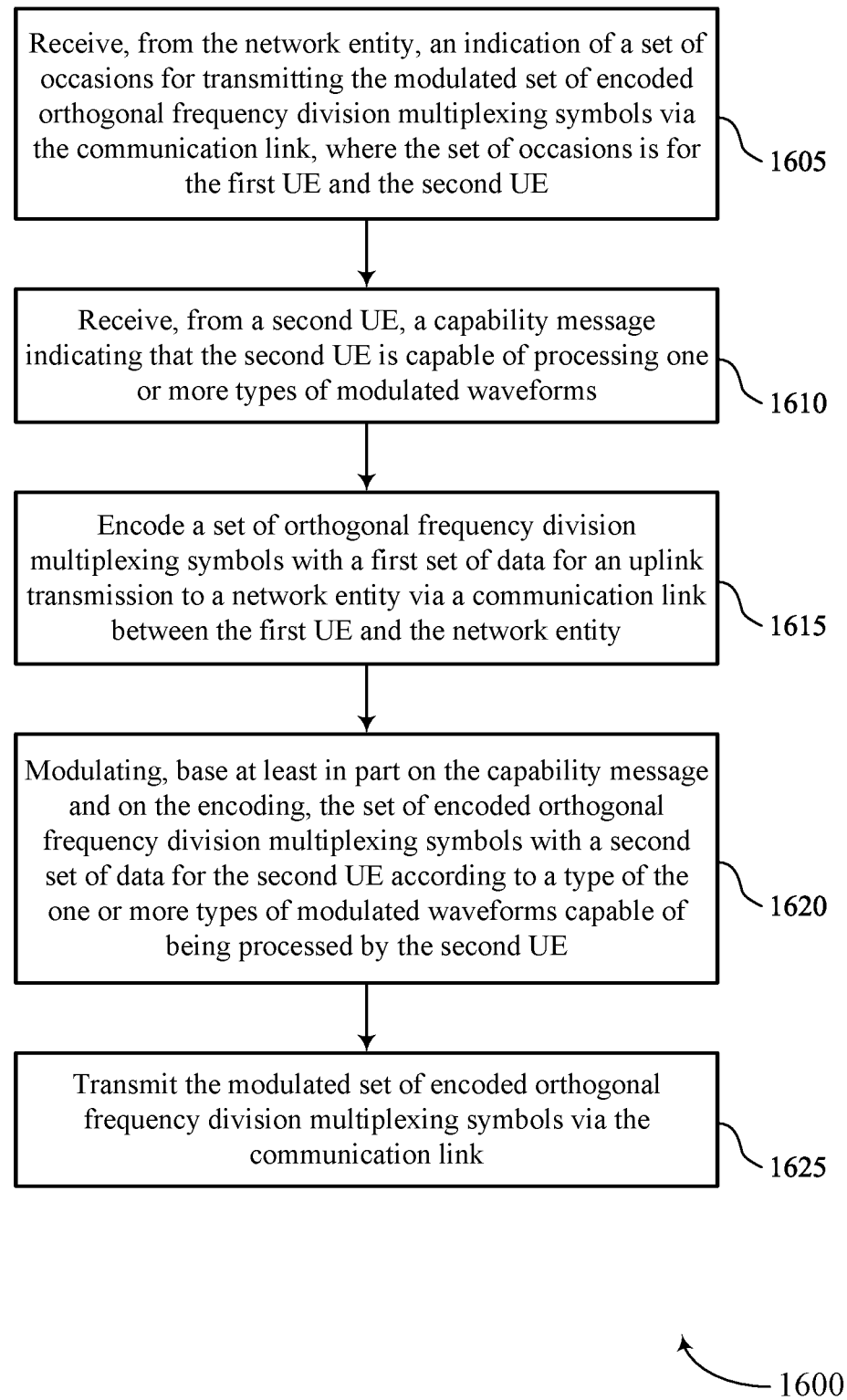

FIG. 16 shows a flowchart illustrating a method 1600 that supports capability-based modulation of communications between wireless communication devices in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving, from the network entity, an indication of a set of occasions for transmitting the modulated set of encoded OFDM symbols via the communication link, where the set of occasions is for the first UE and the second UE. The operations of block 1605 may be performed in accordance with examples as disclosed herein. In some examples, aspects of the operations of 1605 may be performed by a control signaling component 860 as described with reference to FIG. 8.

At 1610, the method may include receiving, from a second UE, a capability message indicating that the second UE is capable of processing one or more types of modulated waveforms. The operations of block 1610 may be performed in accordance with examples as disclosed herein. In some examples, aspects of the operations of 1610 may be performed by a capability message processing component 825 as described with reference to FIG. 8.

At 1615, the method may include encoding a set of OFDM symbols with a first set of data for an uplink transmission to a network entity via a communication link between the first UE and the network entity. The operations of block 1615 may be performed in accordance with examples as disclosed herein. In some examples, aspects of the operations of 1615 may be performed by an encoding component 830 as described with reference to FIG. 8.

At 1620, the method may include modulating, based on the capability message and on the encoding, the set of encoded OFDM symbols with a second set of data for the second UE according to a type of the one or more types of modulated waveforms capable of being processed by the second UE. The operations of block 1620 may be performed in accordance with examples as disclosed herein. In some examples, aspects of the operations of 1620 may be performed by a modulation component 835 as described with reference to FIG. 8.

At 1625, the method may include transmitting the modulated set of encoded OFDM symbols via the communication link. The operations of block 1625 may be performed in accordance with examples as disclosed herein. In some examples, aspects of the operations of 1625 may be performed by an OFDM symbol communication component 840 as described with reference to FIG. 8.

Figure 17:
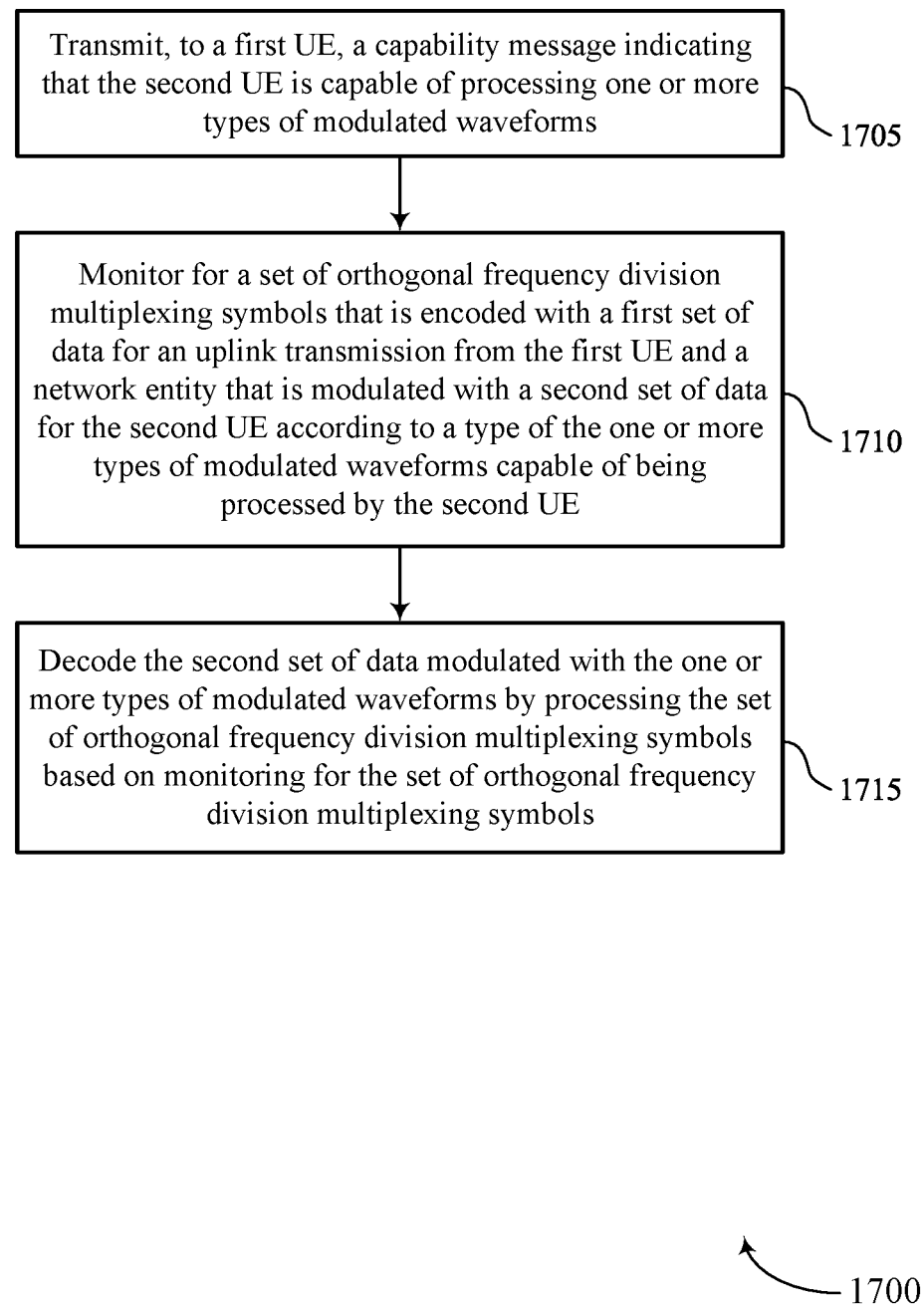

FIG. 17 shows a flowchart illustrating a method 1700 that supports capability-based modulation of communications between wireless communication devices in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include transmitting, to a first UE, a capability message indicating that the second UE is capable of processing one or more types of modulated waveforms. The operations of block 1705 may be performed in accordance with examples as disclosed herein. In some examples, aspects of the operations of 1705 may be performed by a capability message transmission component 845 as described with reference to FIG. 8.

At 1710, the method may include monitoring for a set of OFDM symbols that is encoded with a first set of data for an uplink transmission from the first UE to a network entity that is modulated with a second set of data for the second UE according to a type of the one or more types of modulated waveforms capable of being processed by the second UE. The operations of block 1710 may be performed in accordance with examples as disclosed herein. In some examples, aspects of the operations of 1710 may be performed by a monitoring component 850 as described with reference to FIG. 8.

At 1715, the method may include decoding the second set of data modulated with the one or more types of modulated waveforms by processing the set of OFDM symbols based on monitoring for the set of OFDM symbols. The operations of block 1715 may be performed in accordance with examples as disclosed herein. In some examples, aspects of the operations of 1715 may be performed by an OFDM symbol communication component 840 as described with reference to FIG. 8.

Figure 18:
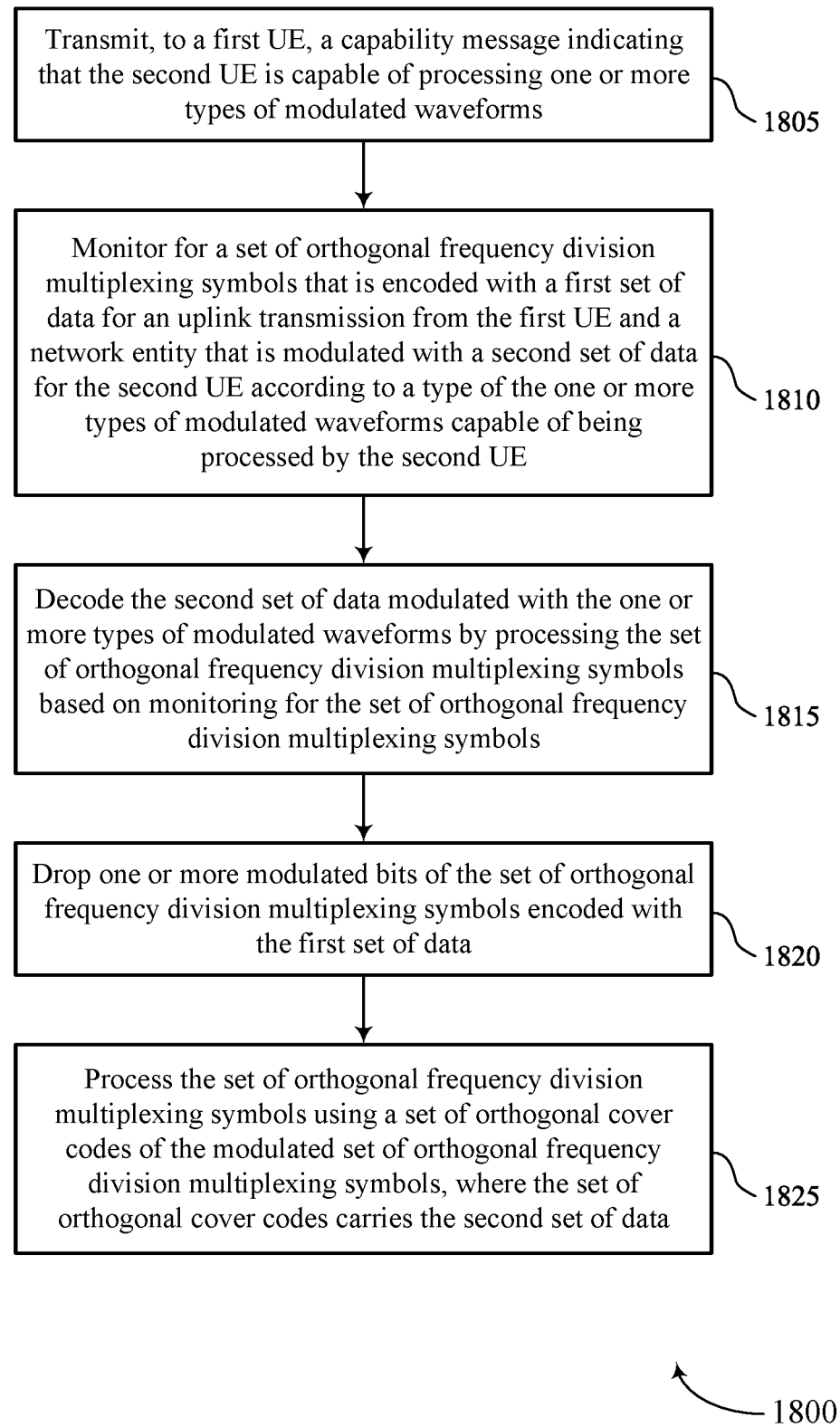

FIG. 18 shows a flowchart illustrating a method 1800 that supports capability-based modulation of communications between wireless communication devices in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include transmitting, to a first UE, a capability message indicating that the second UE is capable of processing one or more types of modulated waveforms. The operations of block 1805 may be performed in accordance with examples as disclosed herein. In some examples, aspects of the operations of 1805 may be performed by a capability message transmission component 845 as described with reference to FIG. 8.

At 1810, the method may include monitoring for a set of OFDM symbols that is encoded with a first set of data for an uplink transmission from the first UE to a network entity that is modulated with a second set of data for the second UE according to a type of the one or more types of modulated waveforms capable of being processed by the second UE. The operations of block 1810 may be performed in accordance with examples as disclosed herein. In some examples, aspects of the operations of 1810 may be performed by a monitoring component 850 as described with reference to FIG. 8.

At 1815, the method may include decoding the second set of data modulated with the one or more types of modulated waveforms by processing the set of OFDM symbols based on monitoring for the set of OFDM symbols. The operations of block 1815 may be performed in accordance with examples as disclosed herein. In some examples, aspects of the operations of 1815 may be performed by an OFDM symbol communication component 840 as described with reference to FIG. 8.

At 1820, the method may include dropping one or more modulated bits of the set of OFDM symbols encoded with the first set of data. The operations of block 1820 may be performed in accordance with examples as disclosed herein. In some examples, aspects of the operations of 1820 may be performed by an OFDM symbol processing component 875 as described with reference to FIG. 8.

At 1825, the method may include processing the set of OFDM symbols using a set of orthogonal cover codes of the modulated set of OFDM symbols, where the set of orthogonal cover codes carries the second set of data. The operations of block 1825 may be performed in accordance with examples as disclosed herein. In some examples, aspects of the operations of 1825 may be performed by an OFDM symbol processing component 875 as described with reference to FIG. 8.

Figure 19:
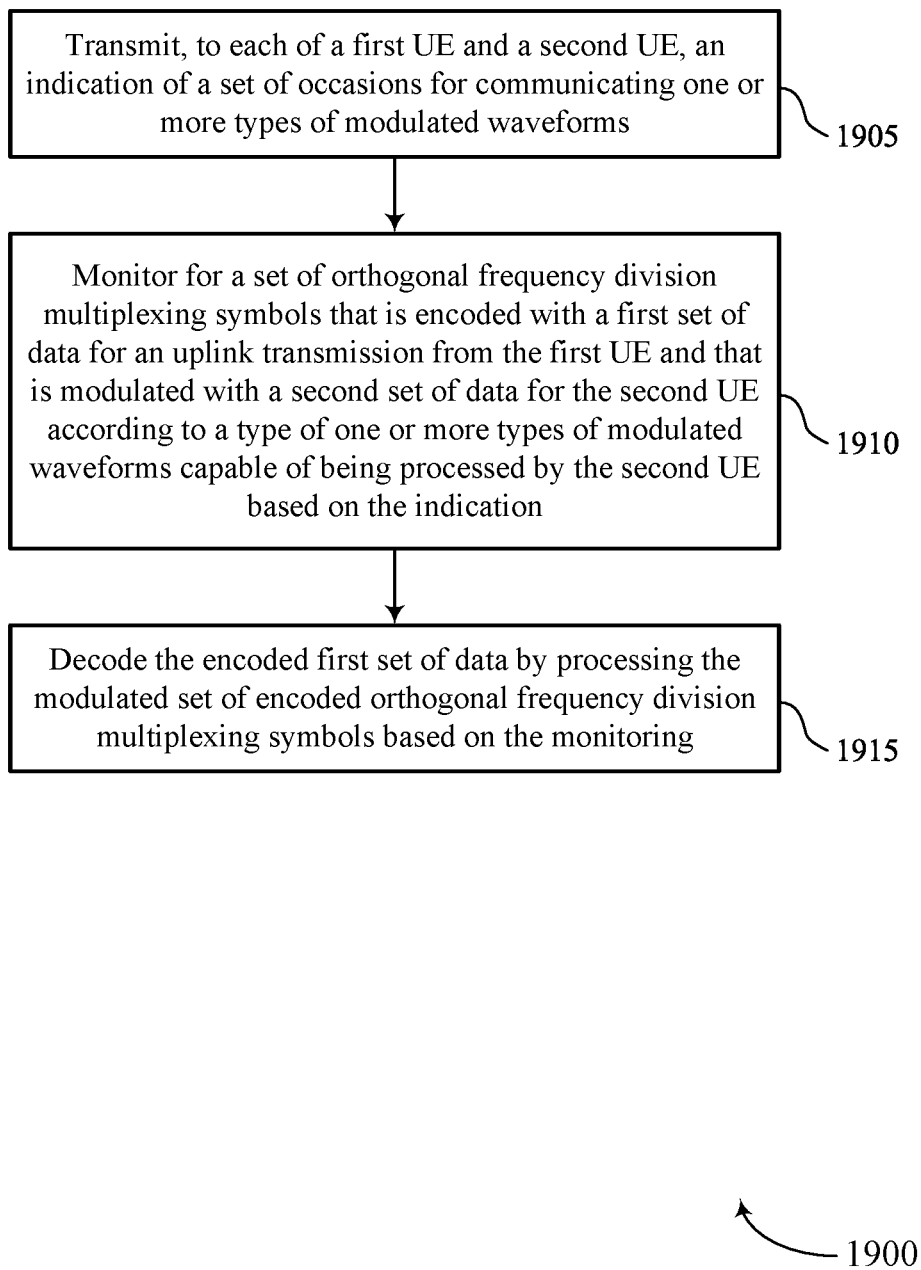

FIG. 19 shows a flowchart illustrating a method 1900 that supports capability-based modulation of communications between wireless communication devices in accordance with aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to each of a first UE and a second UE, an indication of a set of occasions for communicating one or more types of modulated waveforms. The operations of block 1905 may be performed in accordance with examples as disclosed herein. In some examples, aspects of the operations of 1905 may be performed by a downlink control signaling component 1225 as described with reference to FIG. 12.

At 1910, the method may include monitoring for a set of OFDM symbols that is encoded with a first set of data for an uplink transmission from the first UE and that is modulated with a second set of data for the second UE according to a type of one or more types of modulated waveforms capable of being processed by the second UE based on the indication. The operations of block 1910 may be performed in accordance with examples as disclosed herein. In some examples, aspects of the operations of 1910 may be performed by an OFDM symbol monitoring component 1230 as described with reference to FIG. 12.

At 1915, the method may include decoding the encoded first set of data by processing the modulated set of encoded OFDM symbols based on the monitoring. The operations of block 1915 may be performed in accordance with examples as disclosed herein. In some examples, aspects of the operations of 1915 may be performed by an OFDM symbol processing component 1235 as described with reference to FIG. 12.

Figure 20:
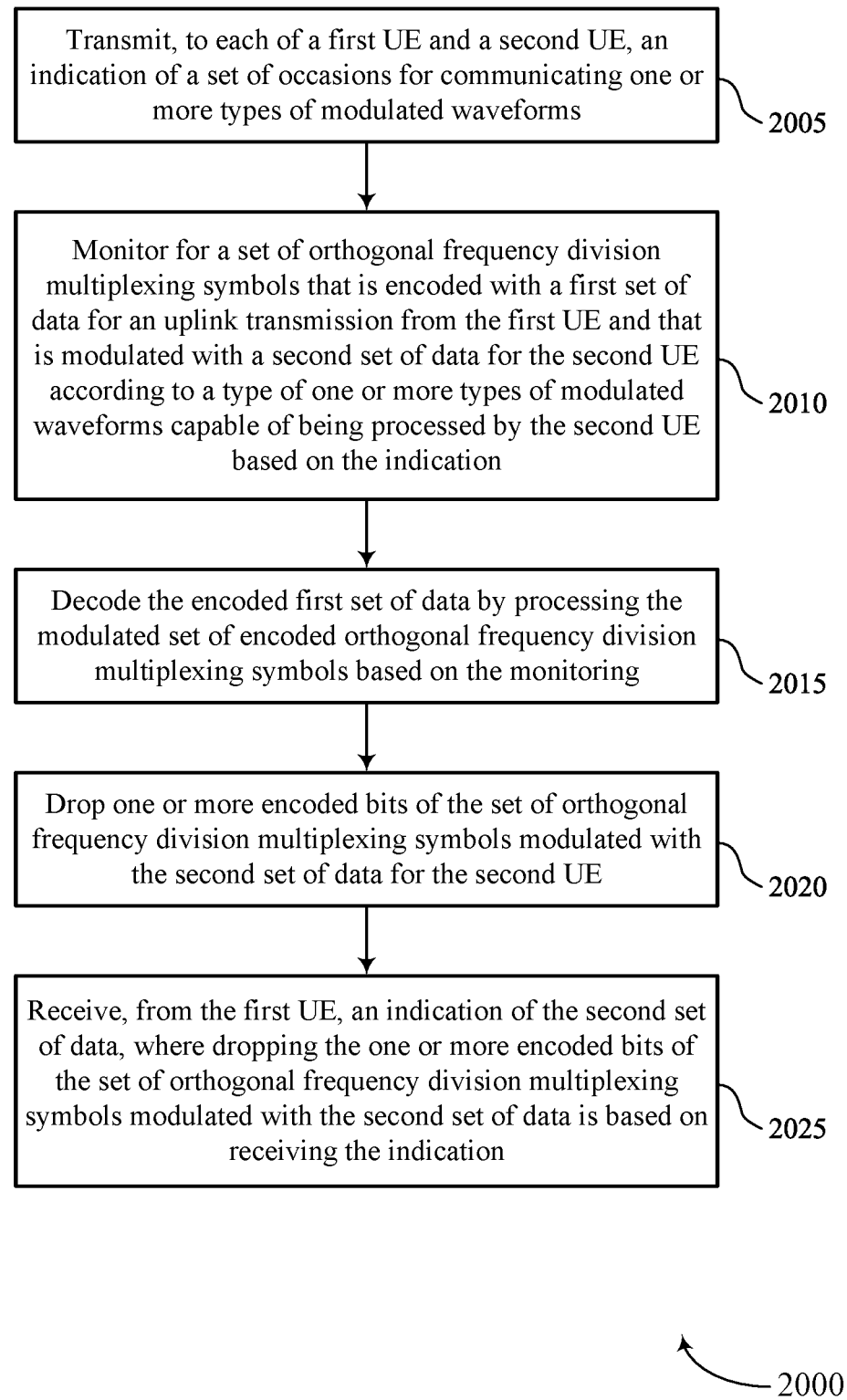

FIG. 20 shows a flowchart illustrating a method 2000 that supports capability-based modulation of communications between wireless communication devices in accordance with aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to each of a first UE and a second UE, an indication of a set of occasions for communicating one or more types of modulated waveforms. The operations of block 2005 may be performed in accordance with examples as disclosed herein. In some examples, aspects of the operations of 2005 may be performed by a downlink control signaling component 1225 as described with reference to FIG. 12.

At 2010, the method may include monitoring for a set of OFDM symbols that is encoded with a first set of data for an uplink transmission from the first UE and that is modulated with a second set of data for the second UE according to a type of one or more types of modulated waveforms capable of being processed by the second UE based on the indication. The operations of block 2010 may be performed in accordance with examples as disclosed herein. In some examples, aspects of the operations of 2010 may be performed by an OFDM symbol monitoring component 1230 as described with reference to FIG. 12.

At 2015, the method may include decoding the encoded first set of data by processing the modulated set of encoded OFDM symbols based on the monitoring. The operations of block 2015 may be performed in accordance with examples as disclosed herein. In some examples, aspects of the operations of 2015 may be performed by an OFDM symbol processing component 1235 as described with reference to FIG. 12.

At 2020, the method may include dropping one or more modulated bits of the second set of data for the second UE. The operations of block 2020 may be performed in accordance with examples as disclosed herein. In some examples, aspects of the operations of 2020 may be performed by an OFDM symbol processing component 1235 as described with reference to FIG. 12.

At 2025, the method may include receiving, from the first UE, an indication of the second set of data, where dropping the one or more modulated bits of the second set of data is based on receiving the indication. The operations of block 2025 may be performed in accordance with examples as disclosed herein. In some examples, aspects of the operations of 2025 may be performed by an uplink control signaling component 1245 as described with reference to FIG. 12.

The following provides an overview of aspects of the present disclosure:

Aspect 1: A method for wireless communication at a first UE, comprising: receiving, from a second UE, a capability message indicating that the second UE is capable of processing one or more types of modulated waveforms; encoding a set of OFDM symbols with a first set of data for an uplink transmission to a network entity via a communication link between the first UE and the network entity; modulating, based at least in part on the capability message and on the encoding, the set of encoded OFDM symbols with a second set of data for the second UE according to a type of the one or more types of modulated waveforms capable of being processed by the second UE; and transmitting the modulated set of encoded OFDM symbols via the communication link.

Aspect 2: The method of aspect 1, wherein transmitting the modulated set of encoded OFDM symbols comprises: transmitting the modulated set of encoded OFDM symbols via the communication link to the network entity, wherein the communication link comprises a UE-to-network air interface.

Aspect 3: The method of any of aspects 1 through 2, further comprising: receiving, from the network entity, an indication of a set of occasions for transmitting the modulated set of encoded OFDM symbols via the communication link, wherein the set of occasions is for the first UE and the second UE.

Aspect 4: The method of aspect 3, wherein at least one occasion of the set of occasions is dedicated for one or more of a channel sate information report between the first UE and the second UE, configuration information between the first UE and the second UE, power control information between the first UE and the second UE, RF tag information, or any combination thereof.

Aspect 5: The method of any of aspects 1 through 4, wherein encoding the set of OFDM symbols with the first set of data comprises: encoding a set of bits associated with a sounding reference signal, a physical uplink shared channel, or a physical uplink control channel.

Aspect 6: The method of any of aspects 1 through 5, wherein modulating the set of encoded OFDM symbols with the second set of data comprises: modulating the set of encoded OFDM symbols with a set of orthogonal cover codes indicating the second set of data.

Aspect 7: The method of any of aspects 1 through 6, wherein modulating the set of encoded OFDM symbols with the second set of data comprises: modulating the set of encoded OFDM symbols with the second set of data comprising one or more of a pattern identification, a sequence identification, or a scrambling identification, corresponding to the second set of data.

Aspect 8: The method of any of aspects 1 through 7, further comprising: receiving, from the network entity, a control signal indicating one or more parameters for a set of orthogonal cover codes; and applying the one or more parameters to the set of OFDM symbols as part of encoding the second set of data in accordance with an orthogonal cover code of the set of orthogonal cover codes.

Aspect 9: The method of any of aspects 1 through 8, further comprising: receiving, from the network entity, a grant comprising an indication to modulate the set of encoded OFDM symbols with the second set of data for the second UE and indicating a first plurality of resources for communicating with the network entity and indicating a second set of resources for transmitting the second set of data to the network entity.

Aspect 10: The method of aspect 9, wherein receiving the indication comprises: receiving downlink control information comprising the indication, a first timing offset for transmitting the second set of data, and a second timing offset for transmitting the modulated set of encoded OFDM symbols via the communication link.

Aspect 11: The method of any of aspects 1 through 10, further comprising: transmitting, to the network entity, an indication of the second set of data prior to transmitting the modulated set of encoded OFDM symbols via the communication link.

Aspect 12: The method of any of aspects 1 through 11, wherein receiving the capability message comprises: receiving the capability message via a random access channel message 1, a random access channel message 3, a UE class indication, a layer 1 message, a layer 2 message, or a layer 3 message, or any combination thereof.

Aspect 13: The method of any of aspects 1 through 12, further comprising: transmitting a capability enquiry message to the second UE, wherein the capability message is received in response to the capability enquiry message.

Aspect 14: The method of any of aspects 1 through 13, wherein the one or more types of modulated waveforms comprises on/off key-based orthogonal frequency-division multiplexing waveforms, discrete Fourier transform-based modulated waveforms, Zadoff-Chu modulated waveforms, pulse position modulated waveforms, pulse-width modulated waveforms, pulse-amplitude modulated waveforms, amplitude-shift keying-based modulated waveforms, phase-shift keying-based modulated waveforms, frequency-shift keying-based modulated waveforms, Manchester modulated waveforms, chirp-based modulated waveforms, Walsh modulated waveforms, or any combination thereof.

Aspect 15: A method for wireless communication at a second UE, comprising: transmitting, to a first UE, a capability message indicating that the second UE is capable of processing one or more types of modulated waveforms; monitoring for a set of OFDM symbols that is encoded with a first set of data for an uplink transmission from the first UE and a network entity that is modulated with a second set of data for the second UE according to a type of the one or more types of modulated waveforms capable of being processed by the second UE; and decoding the second set of data modulated with the one or more types of modulated waveforms by processing the set of OFDM symbols based at least in part on monitoring for the set of OFDM symbols.

Aspect 16: The method of aspect 15, wherein processing the set of OFDM symbols comprises: dropping one or more encoded bits of the set of OFDM symbols encoded with the first set of data.

Aspect 17: The method of any of aspects 15 through 16, wherein processing the set of OFDM symbols comprises: processing the set of OFDM symbols using a set of orthogonal cover codes of the modulated set of OFDM symbols, wherein the set of orthogonal cover codes carries the second set of data.

Aspect 18: The method of any of aspects 15 through 17, further comprising: performing a synchronization procedure with the first UE using a set of dedicated reference signal resources via a UE-to-network air interface.

Aspect 19: The method of any of aspects 15 through 18, further comprising: receiving, from the network entity, an indication of a set of occasions to monitor for the set of OFDM symbols, wherein the set of occasions is for the first UE and the second UE.

Aspect 20: The method of aspect 19, wherein at least one occasion of the set of occasions is dedicated for one or more of a channel sate information report between the first UE and the second UE, configuration information between the first UE and the second UE, power control information between the first UE and the second UE, RF tag information, or any combination thereof.

Aspect 21: A method for wireless communication at a network entity, comprising: transmitting, to each of a first UE and a second UE, an indication of a set of occasions for communicating one or more types of modulated waveforms; monitoring for a set of OFDM symbols that is encoded with a first set of data for an uplink transmission from the first UE and that is modulated with a second set of data for the second UE according to a type of one or more types of modulated waveforms capable of being processed by the second UE based at least in part on the indication; and decoding the encoded first set of data by processing the modulated set of encoded OFDM symbols based at least in part on the monitoring.

Aspect 22: The method of aspect 21, wherein processing modulated set of encoded OFDM symbols comprises: dropping one or more modulated bits of the set of OFDM symbols modulated with the second set of data for the second UE.

Aspect 23: The method of aspect 22, further comprising: receiving, from the first UE, an indication of the second set of data, wherein dropping the one or more encoded bits of the set of OFDM symbols modulated with the second set of data is based at least in part on receiving the indication.

Aspect 24: The method of any of aspects 21 through 23, further comprising: transmitting, to the first UE, a control signal indicating one or more parameters for a set of orthogonal cover codes as part of encoding the set of OFDM symbols with the second set of data in accordance with an orthogonal cover code of the set of orthogonal cover codes.

Aspect 25: The method of aspect 24, wherein processing the modulated set of encoded OFDM symbols comprises: decoding the second set of data jointly with the first set of data based at least in part on transmitting the control signal indicating the one or more parameters for the set of orthogonal cover codes.

Aspect 26: The method of any of aspects 21 through 25, further comprising: transmitting, to the first UE, a grant comprising an indication to modulate the set of encoded OFDM symbols with the second set of data for the second UE and indicating a first plurality of resources for communicating with the network entity and indicating a second set of resources for transmitting the second set of data to the network entity.

Aspect 27: The method of aspect 26, wherein transmitting the indication comprises: transmitting downlink control information comprising the indication, a first timing offset for transmitting the second set of data, and a second timing offset for transmitting the modulated set of encoded OFDM symbols to the network entity.

Aspect 28: The method of any of aspects 21 through 27, further comprising: transmitting, to the first UE, control signaling indicating a puncturing pattern for encoding the set of OFDM symbols with the second set of data.

Aspect 29: An apparatus for wireless communication at a first UE, comprising a memory; a processor coupled to the memory and configured to cause the apparatus to perform a method of any of aspects 1 through 14.

Aspect 30: An apparatus for wireless communication at a first UE, comprising at least one means for performing a method of any of aspects 1 through 14.

Aspect 31: A non-transitory computer-readable medium storing code for wireless communication at a first UE, the code comprising instructions executable by a processor to perform a method of any of aspects 1 through 14.

Aspect 32: An apparatus for wireless communication at a second UE, comprising: a memory; a processor coupled to the memory and configured to cause the apparatus to perform a method of any of aspects 15 through 20.

Aspect 33: An apparatus for wireless communication at a second UE, comprising at least one means for performing a method of any of aspects 15 through 20.

Aspect 34: A non-transitory computer-readable medium storing code for wireless communication at a second UE, the code comprising instructions executable by a processor to perform a method of any of aspects 15 through 20.

Aspect 35: An apparatus for wireless communication at a network entity, comprising a memory; a processor coupled to the memory and configured to cause the apparatus to perform a method of any of aspects 21 through 28.

Aspect 36: An apparatus for wireless communication at a network entity, comprising at least one means for performing a method of any of aspects 21 through 28.

Aspect 37: A non-transitory computer-readable medium storing code for wireless communication at a network entity, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
   a memory; and
   a processor coupled to the memory and configured to cause the apparatus to:
   receive, from a second UE, a capability message indicating that the second UE is capable of processing one or more types of modulated waveforms;
   encode a set of orthogonal frequency division multiplexing symbols with a first set of data for an uplink transmission to a network entity via a communication link between the first UE and the network entity;
   modulate, based at least in part on the capability message and on the encoding, the set of encoded orthogonal frequency division multiplexing symbols with a second set of data for the second UE according to a type of the one or more types of modulated waveforms capable of being processed by the second UE; and
   transmit the modulated set of encoded orthogonal frequency division multiplexing symbols via the communication link.

2. The apparatus of claim 1, wherein the processor configured to cause the apparatus to transmit the modulated set of encoded orthogonal frequency division multiplexing symbols is further configured to cause the apparatus to:
   transmit the modulated set of encoded orthogonal frequency division multiplexing symbols via the communication link to the network entity, wherein the communication link comprises a UE-to-network air interface.

3. The apparatus of claim 1, wherein the processor is further configured to cause the apparatus to:
   receive, from the network entity, an indication of a set of occasions for transmitting the modulated set of encoded orthogonal frequency division multiplexing symbols via the communication link, wherein the set of occasions is for the first UE and the second UE.

4. The apparatus of claim 3, wherein at least one occasion of the set of occasions is dedicated for one or more of a channel sate information report between the first UE and the second UE, configuration information between the first UE and the second UE, power control information between the first UE and the second UE, radio frequency tag information, or any combination thereof.

5. The apparatus of claim 1, wherein the processor configured to cause the apparatus to encode the set of orthogonal frequency division multiplexing symbols with the first set of data is further configured to cause the apparatus to:
   encode a set of bits associated with a sounding reference signal, a physical uplink shared channel, or a physical uplink control channel.

6. The apparatus of claim 1, wherein the processor configured to cause the apparatus to modulate the set of encoded orthogonal frequency division multiplexing symbols with the second set of data is further configured to cause the apparatus to:
   modulate the set of encoded orthogonal frequency division multiplexing symbols with a set of orthogonal cover codes indicating the second set of data.

7. The apparatus of claim 1, wherein the processor configured to cause the apparatus to modulate the set of encoded orthogonal frequency division multiplexing symbols with the second set of data is further configured to cause the apparatus to:
   modulate the set of encoded orthogonal frequency division multiplexing symbols with the second set of data comprising one or more of a pattern identification, a sequence identification, or a scrambling identification, corresponding to the second set of data.

8. The apparatus of claim 1, wherein the processor is further configured to cause the apparatus to:
   receive, from the network entity, a control signal indicating one or more parameters for a set of orthogonal cover codes; and
   apply the one or more parameters to the set of orthogonal frequency division multiplexing symbols as part of encoding the second set of data in accordance with an orthogonal cover code of the set of orthogonal cover codes.

9. The apparatus of claim 1, wherein the processor is further configured to cause the apparatus to:
   receive, from the network entity, a grant comprising an indication to modulate the set of encoded orthogonal frequency division multiplexing symbols with the second set of data for the second UE and indicating a first plurality of resources for communicating with the network entity and indicating a second set of resources for transmitting the second set of data to the network entity.

10. The apparatus of claim 9, wherein the processor configured to cause the apparatus to receive the indication is further configured to cause the apparatus to:
receive downlink control information comprising the indication, a first timing offset for transmitting the second set of data, and a second timing offset for transmitting the modulated set of encoded orthogonal frequency division multiplexing symbols via the communication link.

11. The apparatus of claim 1, wherein the processor is further configured to cause the apparatus to:
transmit, to the network entity, an indication of the second set of data prior to transmitting the modulated set of encoded orthogonal frequency division multiplexing symbols via the communication link.

12. The apparatus of claim 1, wherein the processor configured to cause the apparatus to receive the capability message is further configured to cause the apparatus to:
receive the capability message via a random access channel message 1, a random access channel message 3, a UE class indication, a layer 1 message, a layer 2 message, or a layer 3 message, or any combination thereof.

13. The apparatus of claim 1, wherein the processor is further configured to cause the apparatus to:
transmit a capability enquiry message to the second UE, wherein the capability message is received in response to the capability enquiry message.

14. The apparatus of claim 1, wherein the one or more types of modulated waveforms comprises on/off key-based orthogonal frequency-division multiplexing waveforms, discrete Fourier transform-based modulated waveforms, Zadoff-Chu modulated waveforms, pulse position modulated waveforms, pulse-width modulated waveforms, pulse-amplitude modulated waveforms, amplitude-shift keying-based modulated waveforms, phase-shift keying-based modulated waveforms, frequency-shift keying-based modulated waveforms, Manchester modulated waveforms, chirp-based modulated waveforms, Walsh modulated waveforms, or any combination thereof.

15. An apparatus for wireless communication at a second user equipment (UE), comprising:
a memory; and
a processor coupled to the memory and configured to cause the apparatus to:
transmit, to a first UE, a capability message indicating that the second UE is capable of processing one or more types of modulated waveforms;
monitor for a set of orthogonal frequency division multiplexing symbols that is encoded with a first set of data for an uplink transmission from the first UE to a network entity that is modulated with a second set of data for the second UE according to a type of the one or more types of modulated waveforms capable of being processed by the second UE; and
decode the second set of data modulated with the one or more types of modulated waveforms by processing the set of orthogonal frequency division multiplexing symbols based at least in part on monitoring for the set of orthogonal frequency division multiplexing symbols.

16. The apparatus of claim 15, wherein the processor configured to cause the apparatus to process the set of orthogonal frequency division multiplexing symbols is further configured to cause the apparatus to:
drop one or more encoded bits of the set of orthogonal frequency division multiplexing symbols encoded with the first set of data.

17. The apparatus of claim 15, wherein the processor configured to cause the apparatus to process the set of orthogonal frequency division multiplexing symbols is further configured to cause the apparatus to:
process the set of orthogonal frequency division multiplexing symbols using a set of orthogonal cover codes of the modulated set of orthogonal frequency division multiplexing symbols, wherein the set of orthogonal cover codes carries the second set of data.

18. The apparatus of claim 15, wherein the processor is further configured to cause the apparatus to:
perform a synchronization procedure with the first UE using a set of dedicated reference signal resources via a UE-to-network air interface.

19. The apparatus of claim 15, wherein the processor is further configured to cause the apparatus to:
receive, from the network entity, an indication of a set of occasions to monitor for the set of orthogonal frequency division multiplexing symbols, wherein the set of occasions is for the first UE and the second UE.

20. The apparatus of claim 19, wherein at least one occasion of the set of occasions is dedicated for one or more of a channel sate information report between the first UE and the second UE, configuration information between the first UE and the second UE, power control information between the first UE and the second UE, radio frequency tag information, or any combination thereof.

21. An apparatus for wireless communication at a network entity, comprising:
a memory; and
a processor coupled to the memory and configured to cause the apparatus to:
transmit, to each of a first user equipment (UE) and a second UE, an indication of a set of occasions for communicating one or more types of modulated waveforms;
monitor for a set of orthogonal frequency division multiplexing symbols that is encoded with a first set of data for an uplink transmission from the first UE and that is modulated with a second set of data for the second UE according to a type of one or more types of modulated waveforms capable of being processed by the second UE based at least in part on the indication; and
decode the encoded first set of data by processing the modulated set of encoded orthogonal frequency division multiplexing symbols based at least in part on the monitoring.

22. The apparatus of claim 21, wherein the processor configured to cause the apparatus to process modulated set of encoded orthogonal frequency division multiplexing symbols is further configured to cause the apparatus to:
drop one or more modulated bits of the second set of data for the second UE.

23. The apparatus of claim 22, wherein the processor is further configured to cause the apparatus to:
receive, from the first UE, an indication of the second set of data, the one or more modulated bits are dropped based at least in part on receiving the indication.

24. The apparatus of claim 21, wherein the processor is further configured to cause the apparatus to:
  transmit, to the first UE, a control signal indicating one or more parameters for a set of orthogonal cover codes as part of encoding the set of orthogonal frequency division multiplexing symbols with the second set of data in accordance with an orthogonal cover code of the set of orthogonal cover codes.

25. The apparatus of claim 24, wherein the processor configured to cause the apparatus to process the modulated set of encoded orthogonal frequency division multiplexing symbols is further configured to cause the apparatus to:
  decode the second set of data jointly with the first set of data based at least in part on transmitting the control signal indicating the one or more parameters for the set of orthogonal cover codes.

26. The apparatus of claim 21, wherein the processor is further configured to cause the apparatus to:
  transmit, to the first UE, a grant comprising an indication to modulate the set of encoded orthogonal frequency division multiplexing symbols with the second set of data for the second UE and indicating a first plurality of resources for communicating with the network entity and indicating a second set of resources for transmitting the second set of data to the network entity.

27. The apparatus of claim 26, wherein the processor configured to cause the apparatus to transmit the indication is further configured to cause the apparatus to:
  transmit downlink control information comprising the indication, a first timing offset for transmitting the second set of data, and a second timing offset for transmitting the modulated set of encoded orthogonal frequency division multiplexing symbols to the network entity.

28. The apparatus of claim 21, wherein the processor is further configured to cause the apparatus to:
  transmit, to the first UE, control signaling indicating a puncturing pattern for encoding the set of orthogonal frequency division multiplexing symbols with the second set of data.

29. A method for wireless communication at a first user equipment (UE), comprising:
  receiving, from a second UE, a capability message indicating that the second UE is capable of processing one or more types of modulated waveforms;
  encoding a set of orthogonal frequency division multiplexing symbols with a first set of data for an uplink transmission to a network entity via a communication link between the first UE and the network entity;
  modulating, based at least in part on the capability message and on the encoding, the set of encoded orthogonal frequency division multiplexing symbols with a second set of data for the second UE according to a type of the one or more types of modulated waveforms capable of being processed by the second UE; and
  transmitting the modulated set of encoded orthogonal frequency division multiplexing symbols via the communication link.

30. The method of claim 29, wherein transmitting the modulated set of encoded orthogonal frequency division multiplexing symbols further comprises:
  transmitting the modulated set of encoded orthogonal frequency division multiplexing symbols via the communication link to the network entity, wherein the communication link comprises a UE-to-network air interface.

* * * * *